United States Patent
Meschter et al.

(10) Patent No.: US 7,636,974 B2
(45) Date of Patent: Dec. 29, 2009

(54) ARTICLE OF APPAREL INCORPORATING A STRATIFIED MATERIAL

(75) Inventors: James Meschter, Portland, OR (US); Susan Diane Cessor, Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 12/192,235

(22) Filed: Aug. 15, 2008

(65) Prior Publication Data

US 2008/0295263 A1    Dec. 4, 2008

Related U.S. Application Data

(60) Division of application No. 11/114,916, filed on Apr. 25, 2005, now Pat. No. 7,424,783, which is a continuation-in-part of application No. 10/609,010, filed on Jun. 30, 2003, now Pat. No. 7,065,820.

(51) Int. Cl.
*A43B 23/00* (2006.01)
*A41D 1/06* (2006.01)

(52) U.S. Cl. .............. 12/146 C; 12/142 E; 36/45; 36/114; 36/3 A

(58) Field of Classification Search .......... 12/142 E, 12/142 EV, 146 C, 142 R; 36/45, 3 R, 3 A, 36/114, 97, 4
See application file for complete search history.

(56) References Cited

U.S. PATENT DOCUMENTS

| | | |
|---|---|---|
| D16,678 S | 5/1886 | Preston |
| 2,034,091 A | 3/1936 | Dunbar |
| 3,790,744 A | 2/1974 | Bowen |
| 3,832,948 A | 9/1974 | Barker |
| 4,265,032 A | 5/1981 | Levine |
| 4,271,568 A | 6/1981 | Durville et al. |
| 4,629,858 A | 12/1986 | Kyle |
| 4,847,184 A | 7/1989 | Taniguchi et al. |
| 4,941,093 A | 7/1990 | Marshall et al. |
| 5,010,231 A | 4/1991 | Huizinga |
| 5,017,423 A | 5/1991 | Bossmann et al. |

(Continued)

FOREIGN PATENT DOCUMENTS

DE          3916126         11/1990

(Continued)

OTHER PUBLICATIONS

International Search Report in corresponding PCT application, International Application No. PCT/US2006/011337, mailed Jun. 21, 2006.

(Continued)

*Primary Examiner*—Ted Kavanaugh
(74) *Attorney, Agent, or Firm*—Banner & Witcoff, Ltd.

(57) ABSTRACT

An article of apparel having a substrate layer and an incised layer is disclosed. The substrate layer is at least partially formed from a material having a first degree of stretchability. The incised layer is secured to the substrate layer and at least partially formed from a material having a second degree of stretchability, the first degree of stretchability being greater than the second degree of stretchability. In addition, the incised layer includes at least a first incision and a second incision that are concentric, the first incision being positioned within the second incision.

20 Claims, 19 Drawing Sheets

U.S. PATENT DOCUMENTS

| | | | |
|---|---|---|---|
| 5,185,511 A | 2/1993 | Yabu | |
| 5,200,592 A | 4/1993 | Yabu | |
| 5,341,157 A | 8/1994 | Campagna et al. | |
| D373,461 S | 9/1996 | Smith | |
| 5,567,207 A | 10/1996 | Lockman et al. | |
| 5,589,090 A | 12/1996 | Song | |
| 5,605,641 A | 2/1997 | Chiba et al. | |
| 5,661,744 A | 8/1997 | Murakami et al. | |
| 5,702,565 A | 12/1997 | Wu et al. | |
| 5,854,751 A | 12/1998 | Di Pietro et al. | |
| D404,555 S | 1/1999 | Gray | |
| 5,883,356 A | 3/1999 | Bauer et al. | |
| 5,916,461 A | 6/1999 | Costin et al. | |
| 5,990,444 A | 11/1999 | Costin | |
| 6,002,099 A | 12/1999 | Martin et al. | |
| 6,006,412 A * | 12/1999 | Bergmann et al. | 12/146 M |
| 6,046,427 A | 4/2000 | Richter et al. | |
| 6,064,034 A | 5/2000 | Rieck | |
| 6,085,122 A | 7/2000 | Manning | |
| 6,140,602 A | 10/2000 | Costin | |
| 6,252,196 B1 | 6/2001 | Costin et al. | |
| 6,315,202 B2 | 11/2001 | Costin et al. | |
| 6,492,616 B1 | 12/2002 | Tanaka et al. | |
| 6,495,237 B1 | 12/2002 | Costin | |
| 6,509,546 B1 | 1/2003 | Egitto et al. | |
| 7,065,820 B2 | 6/2006 | Meschter | |
| 7,421,806 B2 * | 9/2008 | Braynock et al. | 36/100 |
| 7,424,783 B2 * | 9/2008 | Meschter et al. | 36/45 |
| 2001/0055684 A1 | 12/2001 | Davis et al. | |
| 2003/0107203 A1 | 6/2003 | Bauer et al. | |
| 2004/0261295 A1 | 12/2004 | Meschter | |
| 2005/0076536 A1 | 4/2005 | Hatfield et al. | |

FOREIGN PATENT DOCUMENTS

| | | |
|---|---|---|
| FR | 2575114 | 6/1986 |
| FR | 2 698 302 | 11/1993 |
| FR | 2774559 | 8/1999 |
| GB | 2 294 656 | 5/1996 |
| JP | 59106589 | 6/1984 |
| JP | 1-95885 | 4/1989 |
| SU | 1717679 | 3/1992 |
| WO | WO 00/46045 | 8/2000 |
| WO | WO 01/15916 | 3/2001 |

OTHER PUBLICATIONS

First Office Action dated Aug. 17, 2007 in Application No. CN200480018505.5.

* cited by examiner

ARTICLE OF APPAREL INCORPORATING A STRATIFIED MATERIAL

CROSS-REFERENCE TO RELATED APPLICATION

This U.S. patent application is a divisional application of U.S. patent application Ser. No. 11/114,916, filed Apr. 25, 2005, entitled Article Of Apparel Incorporating A Stratified Material, now allowed, which is a continuation-in-part application of and claims priority to U.S. patent application Ser. No. 10/609,010, which was filed in the U.S. Patent and Trademark Office on Jun. 30, 2003 and entitled Article And Method For Laser-Etching Stratified Materials, now U.S. Pat. No. 7,065,820 issued on Jun. 27, 2006, such prior U.S. patent applications being entirely incorporated herein by reference.

BACKGROUND OF THE INVENTION

1. Field of the Invention

The present invention relates to apparel. The invention concerns, more particularly, an article of apparel having a stratified material that includes incisions to define areas of stretch in the apparel.

2. Description of Background Art

Articles of apparel are generally formed from planar elements of material, such as textiles, that are joined together to form a structure that receives a portion of the human body. In general, the human body exhibits a shape that is not easily reproduced by merely planar elements of material. That is, articles of apparel are designed from planar elements of material to accommodate a shape that is non-planar and may vary significantly in proportions from one individual to another individual. Although differences between individuals may be accommodated through articles of apparel with various sizes or stretch properties, individuals with a common size may exhibit significantly different proportions.

An example of an article of apparel that accommodates portions of the human body with varying sizes and proportions is footwear. Conventional articles of athletic footwear generally include two primary elements, an upper and a sole structure. The upper is secured to the sole structure and forms a void on the interior of the footwear for comfortably and securely receiving a foot. The sole structure is positioned between the foot and the ground to attenuate ground reaction forces as the footwear impacts the ground.

The upper generally extends over the instep and toe areas of the foot, along the medial and lateral sides of the foot, and around the heel area of the foot. Access to the void on the interior of the footwear is generally provided by an ankle opening. A lacing system is often incorporated into the upper to selectively increase the size of the ankle opening and permit the wearer to modify certain dimensions of the upper, particularly girth, to accommodate feet with varying dimensions. In addition, the upper may include a tongue that extends under the lacing system to enhance the comfort of the footwear, and the upper may include a heel counter to limit movement of the heel.

Various materials may be utilized in manufacturing the upper. The upper of athletic footwear, for example, may be formed from multiple material layers that include an exterior layer, a middle layer, and an interior layer. The materials forming the exterior layer of the conventional upper may be selected based upon the properties of wear-resistance, flexibility, and air-permeability, for example. With regard to the exterior layer, the toe area and the heel area may be formed of leather, synthetic leather, or a rubber material to impart a relatively high degree of wear-resistance. Leather, synthetic leather, and rubber materials may not exhibit the desired degree of flexibility and air-permeability. Accordingly, various other areas of the exterior layer of the upper may be formed from a synthetic textile. The exterior layer of the upper may be formed, therefore, from numerous material elements that each impart different properties to the upper.

The middle layer of the conventional upper may be formed from a lightweight polymer foam material that provides cushioning and protects the foot from objects that may contact the upper. Similarly, the interior layer of the conventional upper may be formed of a moisture-wicking textile that removes perspiration from the area immediately surrounding the foot. In some articles of athletic footwear, the various layers may be joined with an adhesive, and stitching may be utilized to join elements within a single layer or to reinforce specific areas of the upper.

Based upon the above discussion, the conventional upper is formed from multiple layers, and each layer may be formed from multiple material elements. In manufacturing the upper, the specific materials utilized for each layer and element are selected and then cut to a predetermined shape. Considerable effort is then expended in joining the various elements together, particularly the various material elements forming the exterior layer of the upper.

SUMMARY OF THE INVENTION

One aspect of the present invention is an article of apparel having a substrate layer and an incised layer. The substrate layer is at least partially formed from a material having a first degree of stretchability. The incised layer is secured to the substrate layer and at least partially formed from a material having a second degree of stretchability, the first degree of stretchability being greater than the second degree of stretchability. In addition, the incised layer includes at least a first incision and a second incision that are concentric, the first incision being positioned within the second incision.

Another aspect of the present invention is an article of apparel having a configuration of footwear. The article of apparel includes an upper and a sole structure. The upper defines a void for receiving a foot of a wearer, and the upper includes a substrate layer and a ring layer. The substrate layer extends around at least a portion of the void, and the ring layer is secured to the substrate layer. The ring layer includes at least a first ring and a second ring that are concentric. The first ring is positioned adjacent the second ring, and the first ring is positioned within the second ring. The sole structure is secured to the upper.

Yet another aspect of the present invention is a method of manufacturing an article of apparel. The method includes determining a topography of at least a portion of an individual covered by the article of apparel. A substrate layer is provided and is at least partially formed from a material having a first degree of stretchability. A plurality of concentric incisions are formed in an incised layer. The incisions are shaped as topographical lines corresponding to the topography. The incised layer is formed from a material having a second degree of stretchability, the first degree of stretchability being greater than the second degree of stretchability. In addition, the incised layer is located coextensive with the substrate layer.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

DETAILED DESCRIPTION OF THE INVENTION

The following discussion and accompanying figures disclose various articles of apparel that incorporate aspects of the present invention. The articles of apparel are disclosed as being footwear, a jacket, and a pair of pants. The concepts disclosed with respect to the footwear, jacket, and pants may, however, be applied to a variety of apparel styles that include shirts, headwear, coats, underwear, gloves, and socks, for example. Accordingly, one skilled in the relevant art will recognize that the concepts disclosed herein may be applied to a wide range of apparel styles and are not limited to the specific embodiments discussed below and depicted in the figures.

The articles of apparel disclosed below incorporate a stratified material with at least one incision. As utilized herein, the term "incision" or variants thereof may is intended to encompass a space between material elements as well as a cut or slit in the material. Accordingly, two material elements are separated by an incision when placed adjacent to each other such that a space is formed between the material elements.

The stratified material exhibits one or more stretch properties that vary through at least a portion of a thickness of the material. Accordingly, the surface portion of the stratified material may have lesser stretch than an interior portion of the stratified material. That is, the stretch properties of the stratified material change with respect to the depth of the material. The manner in which the stretch properties change with respect to the depth may also vary within the scope of the present invention. For example, the properties may change gradually throughout the depth to provide a stretch gradient. In other words, a material with gradually increasing stretch throughout the depth of the material is considered a stratified material. In addition, the stretch properties may change at discrete layers within the stratified material. For example, a first layer may have a first degree of stretch, and a second layer may have a different second degree of stretch such that the stratified material has discrete layers with different stretch properties.

Figure 1:
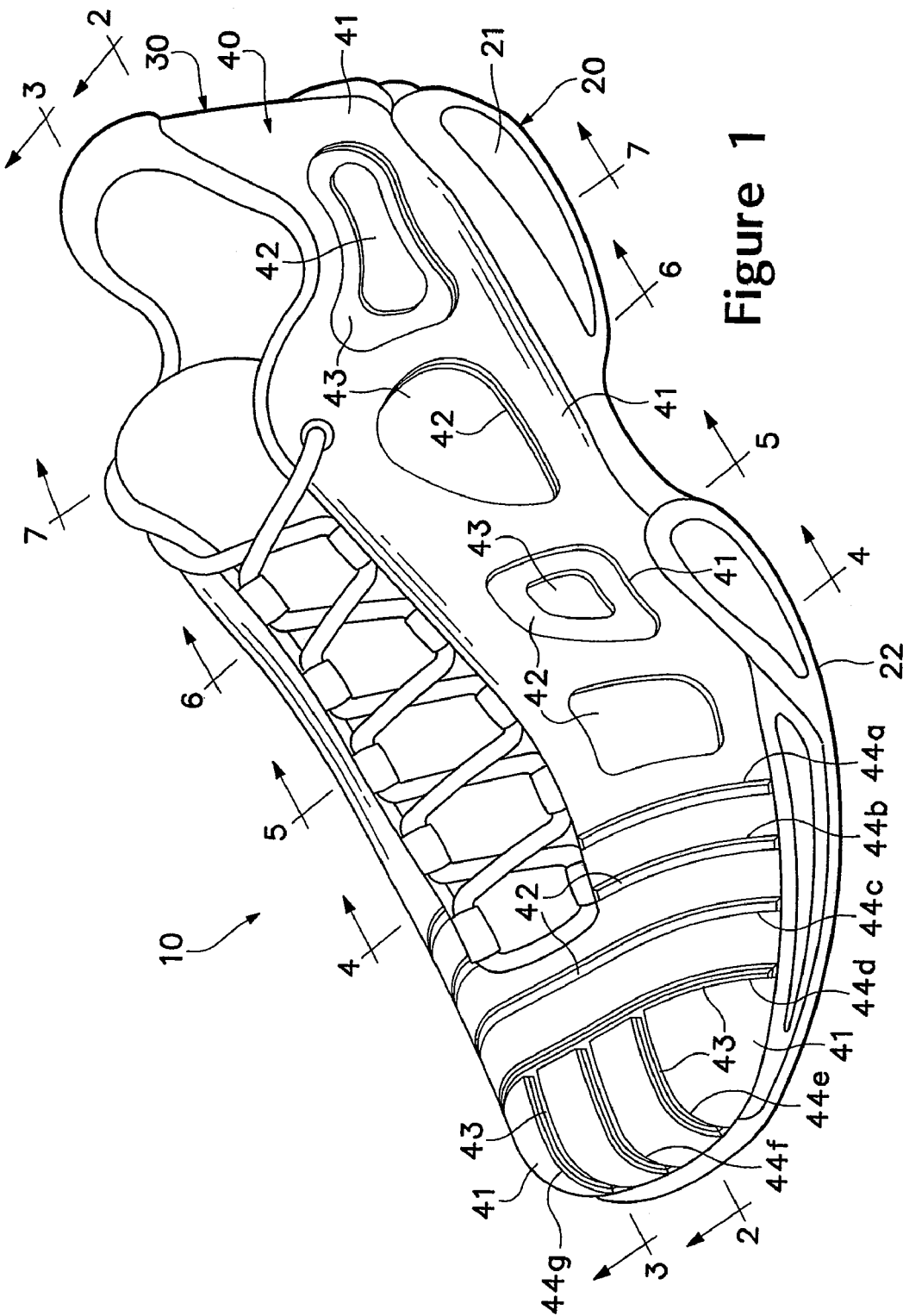
FIG. 1 is a perspective view of a first article of apparel incorporating a stratified material and having a configuration of footwear.

An article of apparel referred to as footwear 10 is depicted in FIG. 1 and has the general configuration of footwear that is utilized during athletic activities. The primary elements of footwear 10 are a sole structure 20 and an upper 30. Sole structure 20 may have a conventional configuration and is depicted as including a midsole 21 and an outsole 22. Midsole 21 is the primary shock attenuating element of footwear 10, and may be formed of a polymer foam, such as ethylvinylacetate or polyurethane foam. Outsole 22 is adhesively-secured to a lower surface of midsole 21 and provides the primary ground-contacting element of footwear 10. Accordingly, outsole 22 is formed of a durable, wear-resistant material such as carbon black rubber compound and may include texturing to enhance traction. Sole structure 20 also includes an insole 23 that is located within upper 30 to enhance the comfort of footwear 10.

Upper 30 is secured to sole structure 20 in a conventional manner and forms a hollow structure or void for comfortably and securely receiving a foot. The material forming upper 30 is configured to extend over medial and lateral sides of the foot, an instep area of the foot, and a toe area of the foot. Furthermore, the material forming upper 30 is configured to extend around the heel area of the foot. A plurality of apertures may be formed in an instep portion of upper 30, and a lace may extend through the apertures to assist with adjusting the fit of footwear 10. A heel counter formed of a semi-rigid polymer material, for example, may also be positioned within the heel area to ensure that the heel remains properly positioned with respect to upper 30.

Based upon the above discussion, upper 30 has the general structure of a conventional upper. In contrast with the conventional upper, however, upper 30 is primarily formed of a stratified material 40 having a plurality of layers that are selectively incised. That is, various incisions are formed in stratified material 40 to expose an underlying layer of stratified material 40. By exposing the underlying layer, the stretch properties of stratified material 40, and thereby the properties of upper 30, may be selectively modified. Accordingly, the incisions formed in stratified material 40 are utilized to selectively vary the stretch properties of stratified material 40 in specific portions of upper 30. Stratified material 40 is depicted and discussed herein as having a layered configuration. Alternately, stratified material 40 may have gradually changing properties.

The number of layers forming stratified material 40 may vary significantly within the scope of the present invention, and may be in the range of two to ten layers, for example. For purposes of discussion, stratified material 40 is depicted in the figures and discussed herein as having a first layer 41, a second layer 42, and a third layer 43. Layers 41-43 are arranged such that first layer 41 forms an exterior layer of stratified material 40, layers 42 and 43 form underlying layers of stratified material 40, and second layer 42 is positioned between first layer 41 and third layer 43. With respect to upper 30, first layer 41 is positioned on an exterior of upper 30, and third layer 43 is positioned on an interior of upper 30 and adjacent to the void within upper 30. The use of three layers 41-43 is intended to be illustrative only, and is not intended to limit the scope of the present invention.

Layers 41-43 are each formed from materials with different stretch properties. That is, the amount of force required to elongate or otherwise deform each of the materials forming layers 41-43 varies. Accordingly, stratified material 40 may be formed such that first layer 41 stretches the least, second layer 42 stretches an intermediate amount, and third layer 43 stretches the most, for example. As an alternative, one of layers 41-43 may exhibit a different stretch property than the other two of layers 41-43. Other properties associated with layers 41-43 may also differ, including abrasion-resistance, durability, air-permeability, and flexibility, for example.

Incisions may be formed in layers 41 and 42 in order to selectively vary the stretch properties of stratified material 40 in the area of the incisions. For purposes of the following discussion, assume that stratified material 40 is formed such that first layer 41 stretches the least, second layer 42 stretches an intermediate amount, and third layer 43 stretches the most. That is, the stretchability of layers 41-43 increases with depth into upper 30. Given this scenario, an incision may be formed in first layer 41 to remove a portion of first layer 41 and reveal second layer 42. Similarly, an incision may be formed in both of layers 41 and 42 to remove portions of layers 41 and 42 and reveal third layer 43. Alternately, the incisions may be utilized to segregate portions of first layer 41, and the segregated portions may be removed to expose the underlying layers. In effect, therefore, the incisions may be utilized to remove material from layers 41 and 42, thereby revealing the stretch properties associated with layers 42 and 43. Accordingly, removing material from layers 41 and 42 exposes the underlying material of layers 42 and 43 and also exposes the corresponding stretch properties of the underlying material.

In areas where no incisions are present, the stretch properties of upper 30 are a combination of the stretch properties of each of layers 41-43 since each of layers 41-43 are present in these areas. Although each of layers 41-43 will contribute to the overall stretch properties of upper 30 in at least these areas, the least stretchable material (i.e., first layer 41) will generally provide the limiting factor in the degree of stretch in these areas of upper 30. In areas where incisions only extend through first layer 41, the stretch properties of upper 30 are a combination of the stretch properties of layers 42 and 43. Although each of layers 42 and 43 will contribute to the overall stretch properties of upper 30 in areas where an incision extends through first layer 41, the least stretchable material (i.e., second layer 42) will generally provide the limiting factor in the degree of stretch in these areas of upper 30. Similarly, the stretch properties of third layer 43 will determine the stretch properties of upper 30 in areas where incisions extend through each of layers 41 and 42.

Figure 2:
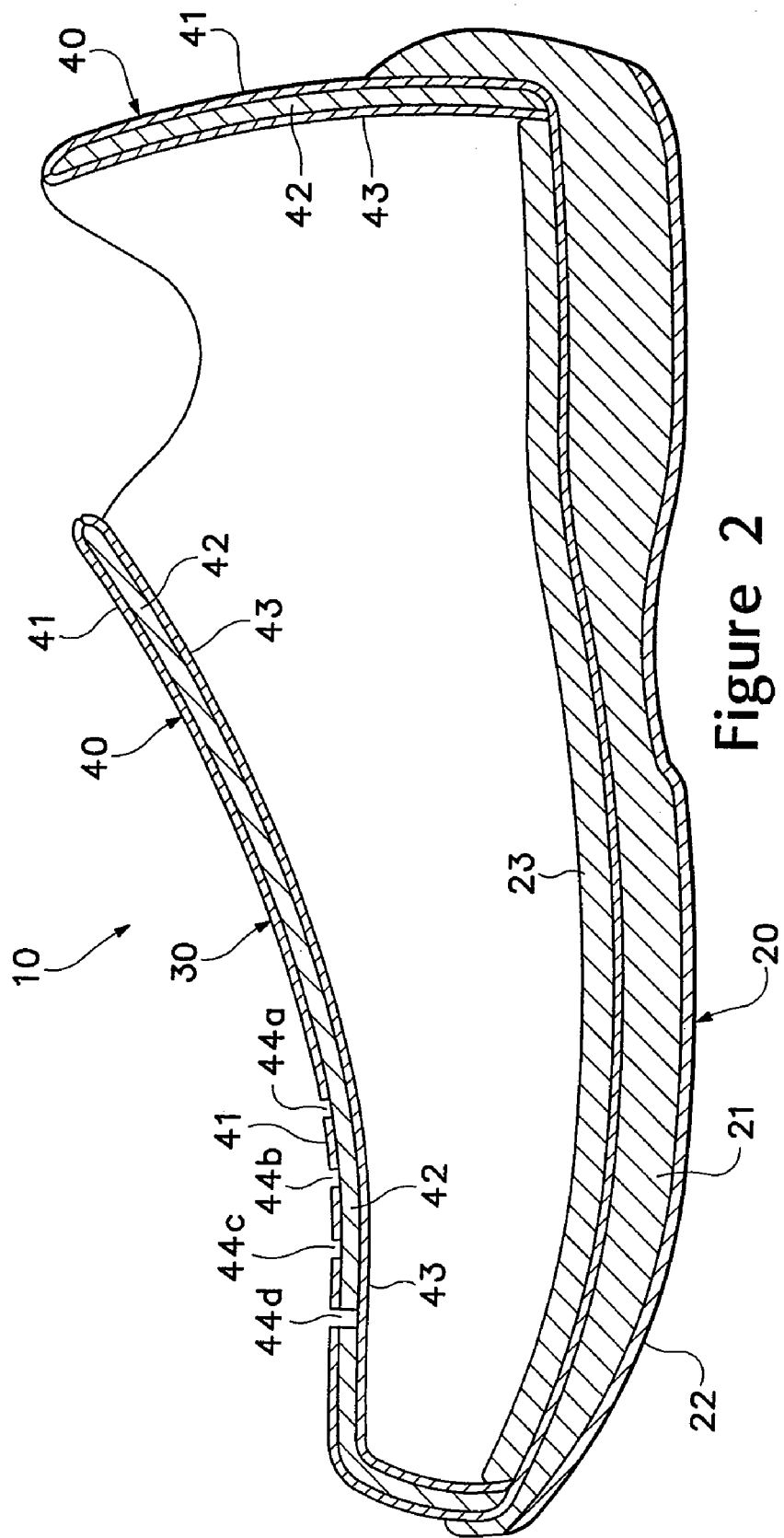
FIGS. 2-7 are various cross-sectional views of the first article of apparel, as respectively defined by section lines 2-7 in FIG. 1.
Figure 3:
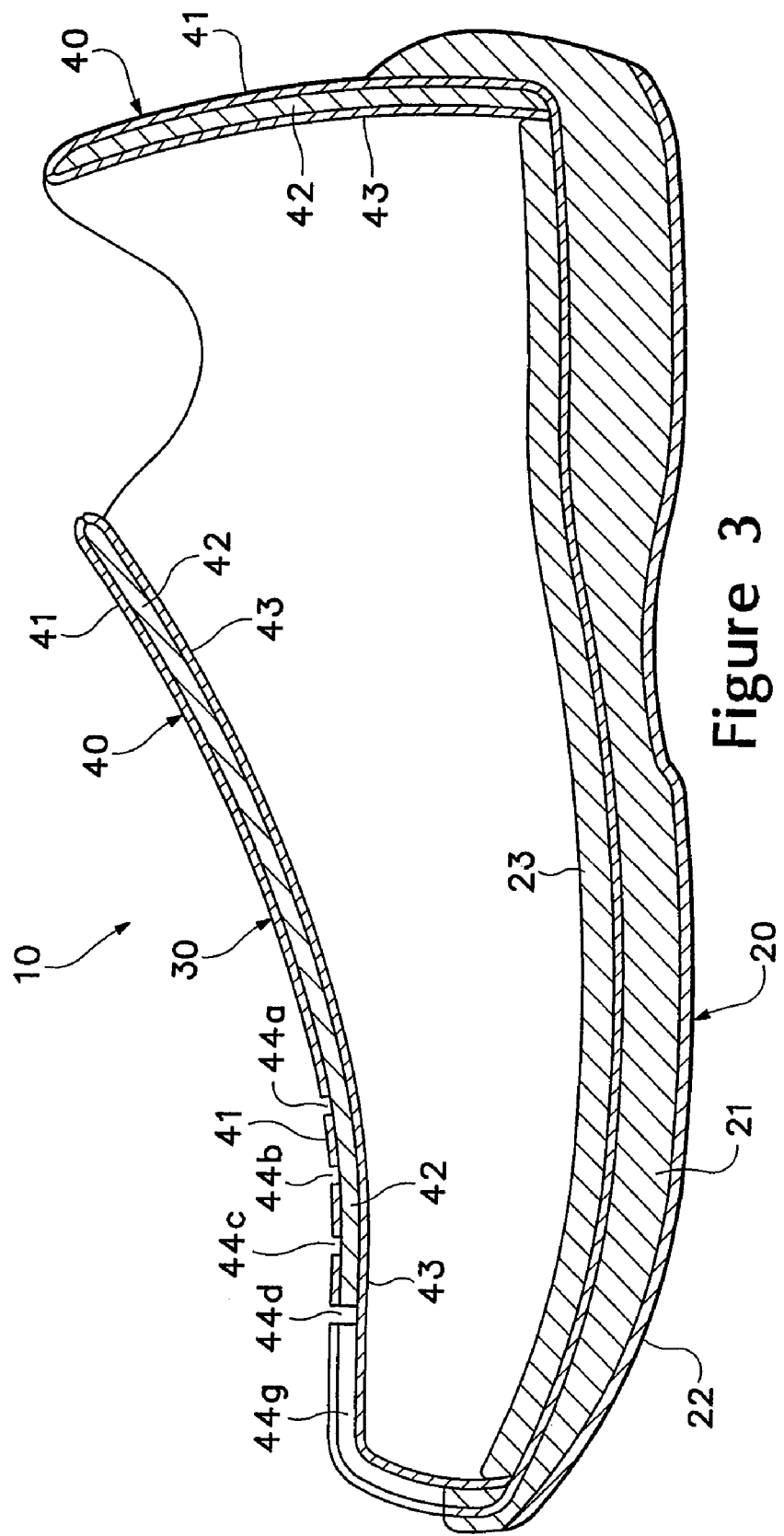

A plurality of incisions 44a-44g are formed in the toe area of upper 30, as depicted in the cross-sections of FIGS. 2 and 3. Incisions 44a-44g represent portions of stratified material 40 that are removed to expose underlying portions of layers 42 and 43. The depth of incisions 44a-44g varies such that either second layer 42 or third layer 43 is exposed. More specifically, incisions 44a-44c have a depth that extends through first layer 41, thereby exposing second layer 42. Incisions 44a-44c provide, therefore, areas of stratified material 40 where the limited stretch of first layer 41 is removed, thereby permitting the greater stretch properties of layers 42 and 43 to be utilized. Similarly, incisions 44d-44g have a depth that extends through first layer 41 and second layer 42, thereby exposing third layer 43. Incisions 44d-44g provide, therefore, areas of stratified material 40 where the limited stretch of layers 41 and 42 are removed, thereby permitting the even greater stretch properties of third layer 43 to be utilized.

In general, incisions 44a-44g are formed by removing or otherwise cutting the portions of stratified material 40 that correspond with incisions 44a-44g. A variety of cutting apparatuses and methods may be utilized to form incisions 44a-44g. For example, a conventional die that cuts selected areas of stratified material 40 may be utilized. In addition, a laser apparatus may be utilized to direct a laser at stratified material 40 to remove portions of layers 41 and 42. It should be noted that incisions 44a-44g may be formed when layers 41-43 are separate from each other so as to be subsequently combined, or incisions 44a-44g may be formed when layers 41-43 are in a coextensive relationship. Incisions 44a-44g are depicted as having a relatively straight configuration. Within the scope of the present invention, however, incisions 44a-44g may exhibit a straight or curved configuration, for example.

Figure 4:
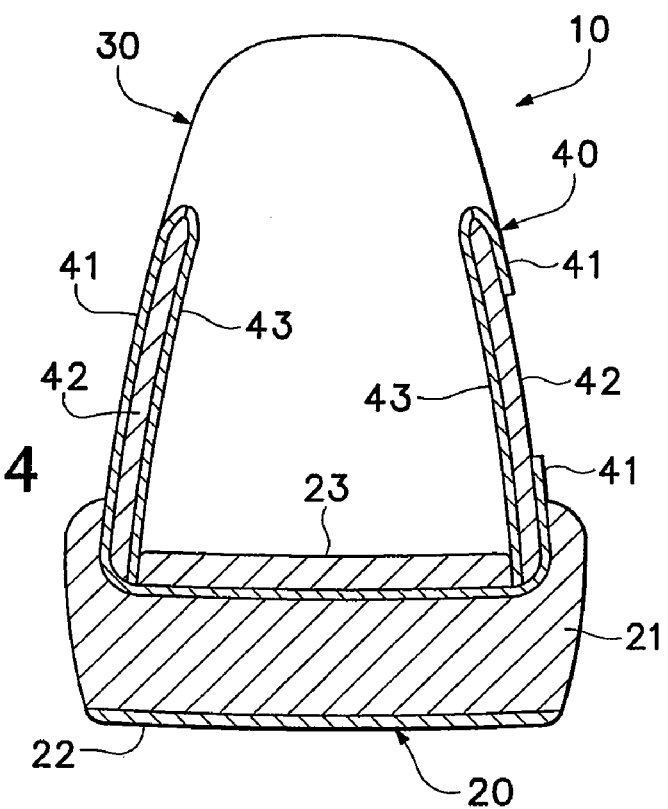

Forming incisions in stratified material 40 is one general method by which underlying portions of layers 42 and 43 may be exposed to modify the stretch properties of upper 30. Various areas of first layer 41 and second layer 42, as depicted in FIG. 1, may also be removed. Referring to FIG. 4, a cross-section defined in FIG. 1 and through footwear 10 is depicted. An area of first layer 41 is removed from stratified material 40 to expose an underlying portion of second layer 42. Whereas incisions 44a-44g have a linear configuration, the area of first layer 41 that is removed has dimensions that are significantly greater than the width of the various incisions 44a-44g.

The removed area of first layer 41 is formed by defining an incision in first layer 41. The incision segregates the portion of first layer 41 that becomes the removed area from a remainder of first layer 41. The segregated portion of first layer 41 is then separated from second layer 42 and removed, thereby exposing the stretch properties of second layer 42. This process effectively forms the removed area of first layer 41 depicted in the cross-section of FIG. 4. This general process will be described in greater detail below.

Figure 5:
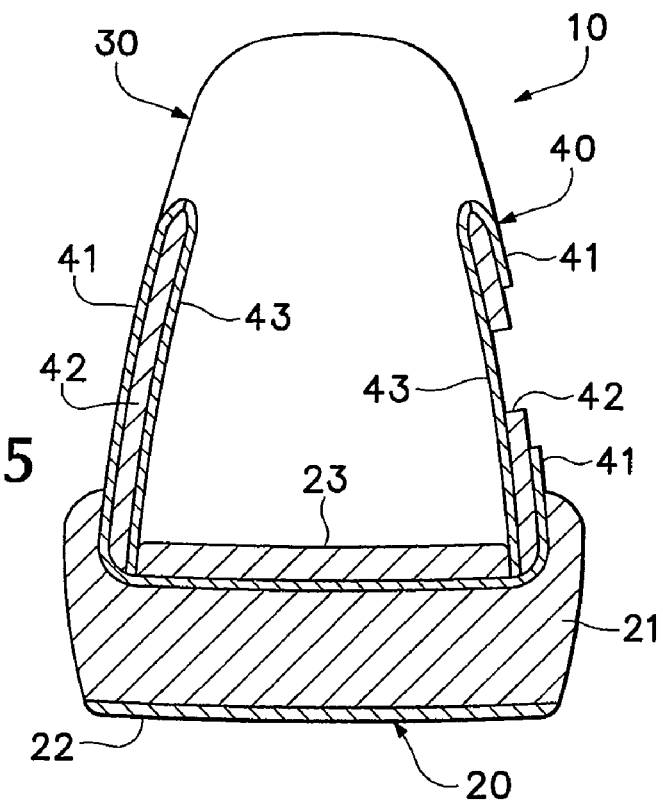

The structure of the removed area discussed relative to FIG. 4 included only a portion of first layer 41. The same general procedure that formed the removed area in first layer 41 may also be utilized to form a removed area in second layer 42, thereby exposing third layer 43. Referring to FIG. 5, another cross-section defined in FIG. 1 and through footwear 10 is depicted. An area of first layer 41 is removed from stratified material 40 to expose an underlying portion of second layer 42. In addition, an area of second layer 42 is also removed to expose an underlying portion of third layer 43. The removed area of first layer 41 exposes second layer 42, and the removed area of second layer 42 exposes third layer 43. The edge of first layer 41 that forms the removed area of first layer 41 is spaced away from the edge of second layer 42 that forms the removed area of second layer 42. Accordingly, stratified material 40 exhibits a stepped configuration due to the removed areas of first layer 41 and second layer 42.

The removed areas of first layer 41 and second layer 42 may be formed by laser-etching a first incision in first layer 41 and then laser-etching a second incision in second layer 42. As discussed above, however, other methods of removing areas of first layer 41 and second layer 42 may be utilized. The first incision segregates the portion of first layer 41 that becomes the removed area from a remainder of first layer 41. The segregated portion of first layer 41 is then separated from second layer 41 and removed, thereby exposing second layer 42. Subsequently, the second incision is utilized to segregate the portion of second layer 42 that becomes the removed area from a remainder of second layer 42. The segregated area of second layer 42 is then separated from third layer 43 and removed, thereby third layer 43. This process effectively forms the removed areas of first layer 41 and second layer 42, as depicted in the cross-section of FIG. 5. This general process will be described in greater detail below.

Figure 6:
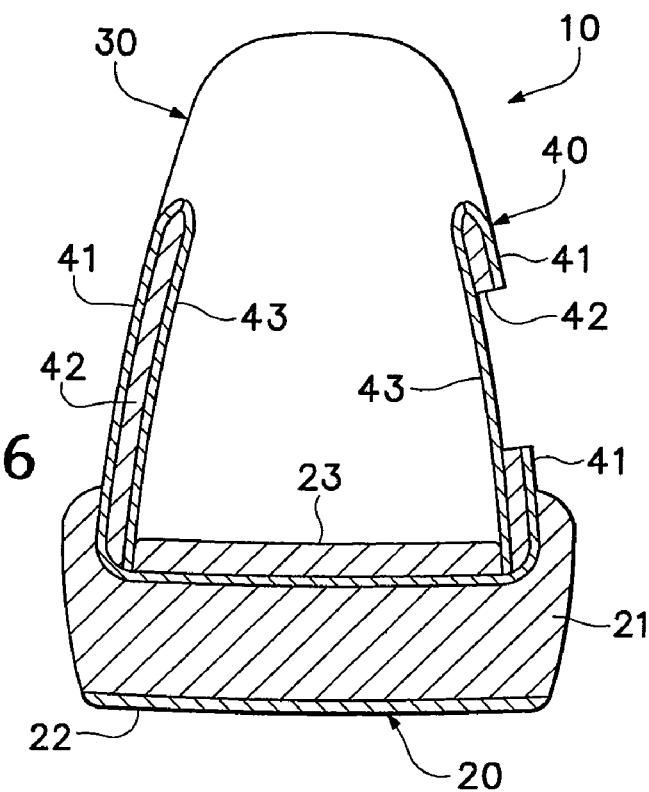

The structure of the removed areas depicted in FIG. 5 exhibited a stepped configuration due to the two separate incisions that are formed in first layer 41 and second layer 42. The laser may also be utilized to form a single incision that extends through first layer 41 and second layer 42. Referring to FIG. 6, another cross-section defined in FIG. 1 through footwear 10 is depicted. An area of first layer 41 is removed from stratified material 40, and a similarly dimensioned area of second layer 42 is also removed from stratified material 40. The edge of first layer 41 that forms the removed area substantially coincides, therefore, with the edge of second layer 42 that also forms the removed area. Accordingly, only third layer 43 is exposed.

The removed area of first layer 41 and the removed area of second layer 42 are formed by laser-etching or otherwise defining a single incision that extends through first layer 41 and second layer 42. The portions of first layer 41 and second layer 42 that are within the boundaries of the incision are then separated from third layer 43 and removed, thereby exposing third layer 43. This process effectively forms the removed areas of first layer 41 and second layer 42 depicted in the cross-section of FIG. 6. This general process will be described in greater detail below.

Figure 7:
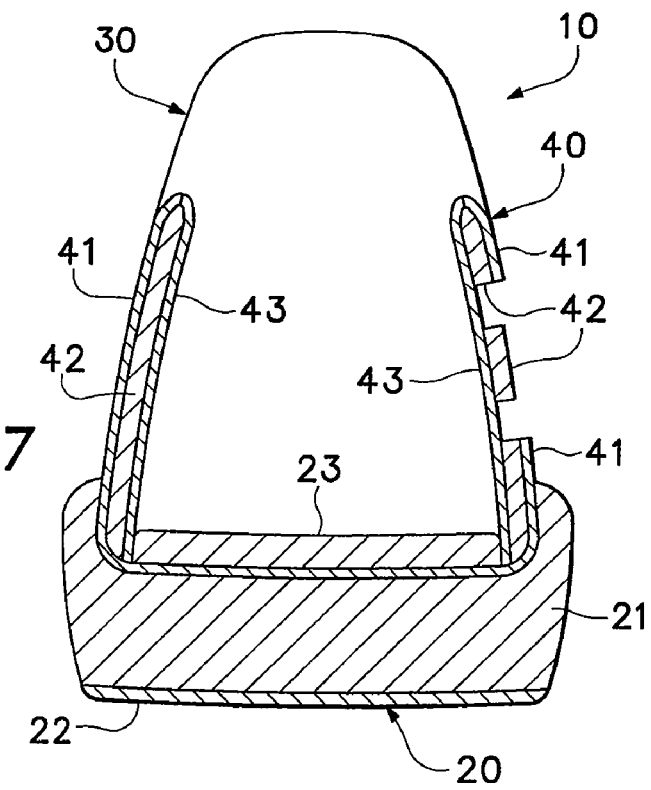

Another cross-sectional view defined in FIG. 1 and through footwear 10 is depicted in FIG. 7, in which areas of first layer 41 and second layer 42 are removed. In contrast with FIG. 6, however, a portion of second layer 42 remains secured to third layer 43. The removed area of first layer 41 is formed by laser-etching or otherwise defining an incision that extends through first layer 41, and then the portion of first layer 41 within the incision is separated from second layer 42. An incision having the same dimensions is then formed in second layer 42, and another concentric incision is also formed in second layer 42. The area of second layer 42 that is between the two incisions is then separated from third layer 43, thereby exposing third layer 43 and leaving a portion of second layer 42 on top of the exposed portion of third layer 43.

FIGS. 4-7 depict four possible configurations for removed areas of first layer 41 and second layer 42. For example, only portions of one layer may be removed, portions of two layers may be removed to form a stepped configuration, portions of two layers may be removed such that edges of the layers coincide, and portions of two layers may be removed so as to leave a portion of one of the removed layers within the removed area. One skilled in the relevant art will recognize that a plurality of other configurations for removing material will also fall within the scope of the present invention.

The method by which material may be removed from stratified material 40 will now be discussed in greater detail. In general, a laser may be utilized to form incisions in stratified material 40. The incisions may have a depth that extends only through first layer 41 or through both first layer 41 and second layer 42. In order to form lines of removed material, as disclosed with reference to incisions 44a-44g of FIGS. 2 and 3, the laser is utilized to merely form incisions to a prescribed depth. In order to form areas of removed material, as disclosed with reference to FIGS. 4-7, portions of stratified material 40 that are within an incision may be separated from an underlying layer. As an alternative to forming incisions in stratified material 40, a laser or other cutting apparatus may be utilized to form incisions in layers 41-43 separately, and the separate layers 41-43 may then be placed in a coextensive configuration to form stratified material 40. That is, layers 41-43 may be combined to form stratified material 40 following the formation of incisions in one or more of layers 41-43.

Figure 8:
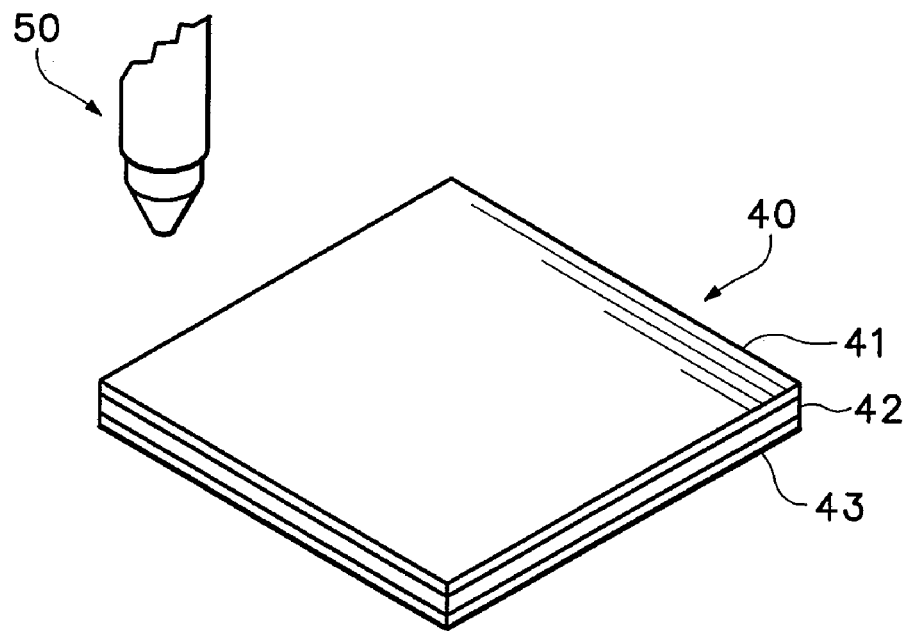
FIGS. 8-17 are various schematic perspective views of a cutting apparatus and the stratified material.

Referring to FIG. 8, a portion of stratified material 40 and a laser apparatus 50 are depicted. As noted above, other cutting apparatuses may also be utilized. Stratified material 40 includes first layer 41, second layer 42, and third layer 43, as discussed above. Laser apparatus 50 has the capacity to produce a laser beam 51 of variable intensity that is capable of forming an incision in stratified material 40 to a prescribed depth. More particularly, laser apparatus 50 may adjust the power of laser beam 51 to form an incision that extends through first layer 41 or through both first layer 41 and second layer 42. In addition to adjusting the power of laser beam 51 in order to vary the depth of the incision, the focus of laser beam 51 and the velocity of laser beam 51 relative to stratified material 40 may be varied. An example of a suitable laser apparatus 50 is any of the conventional $CO_2$ or Nd:YAG laser apparatuses, as disclosed in U.S. Pat. Nos. 5,990,444 and 6,140,602 to Costin.

Figure 9:
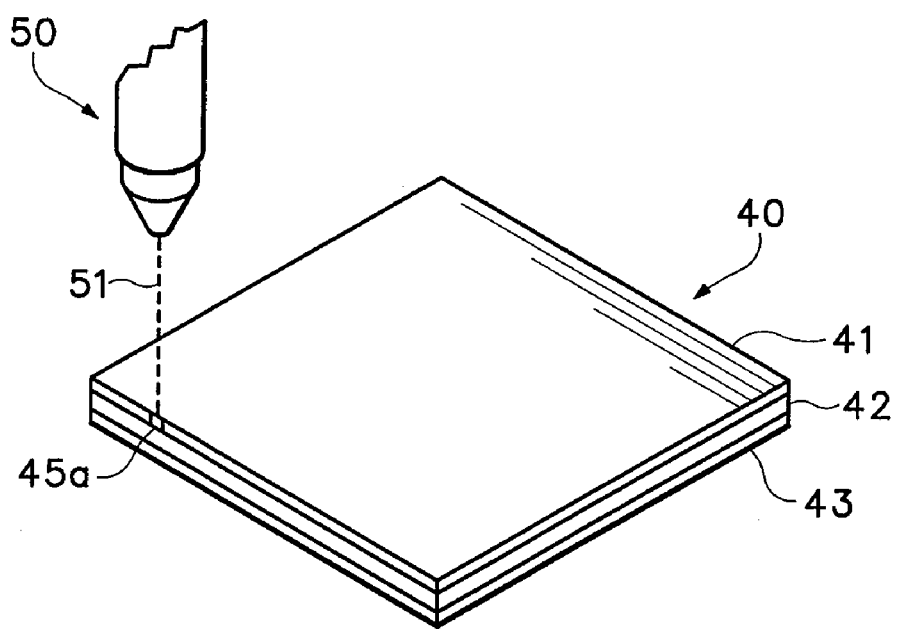
Figure 10:
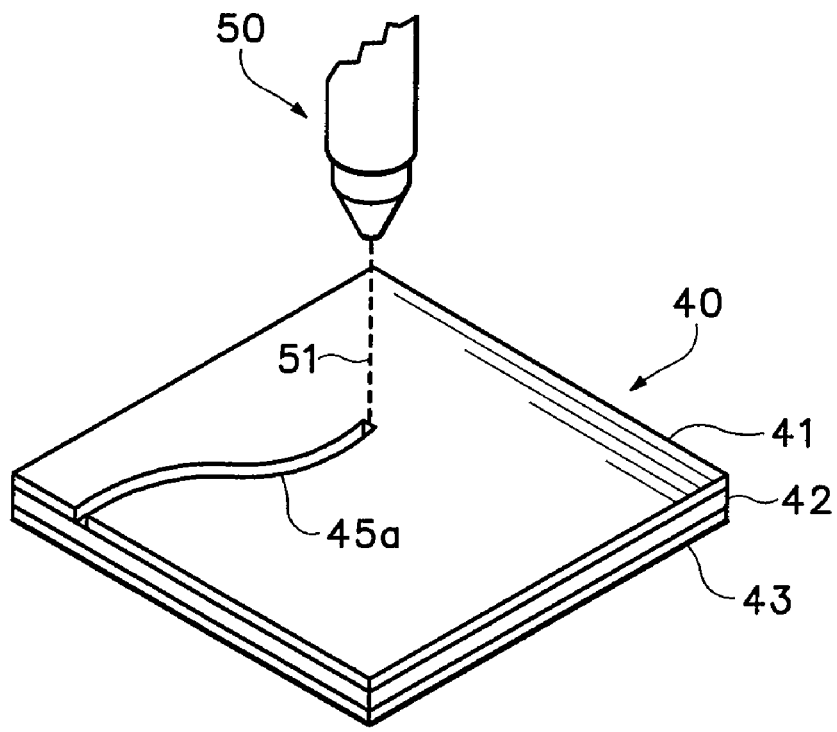
Figure 11:
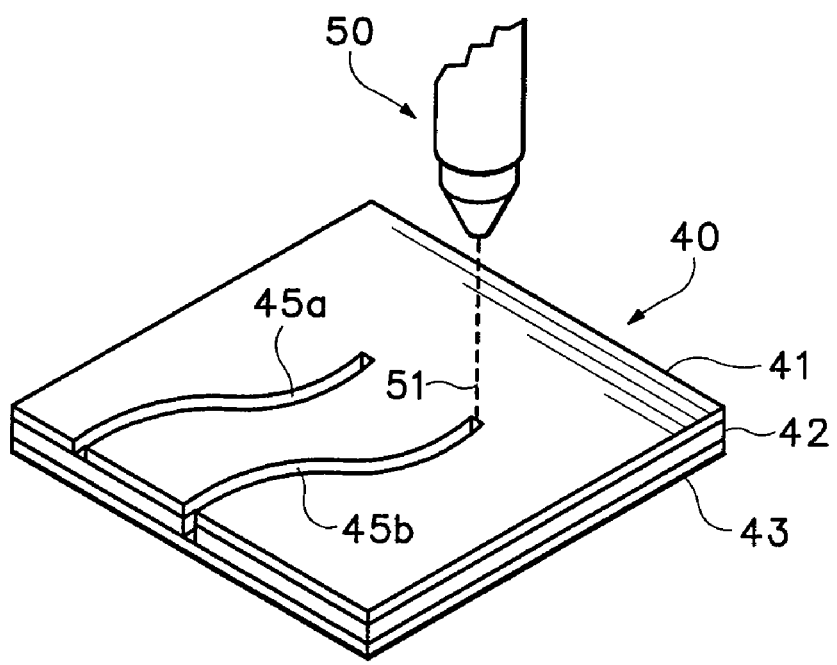

Laser apparatus 50 directs laser beam 51 toward stratified material 40 to begin forming an incision 45a in stratified material 40, as depicted in FIG. 9. Laser apparatus 50 then moves laser beam 51 relative to stratified material 40 to extend the incision through the desired portions of stratified material 40, as depicted in FIG. 10. Incision 45a has a depth that extends only through first layer 41, thereby exposing second layer 42. Referring to FIG. 11, however, an incision 45b may also be formed in stratified material 40 with a depth that extends through both first layer 41 and second layer 42 to expose third layer 43. Accordingly, laser apparatus 50 may be configured to form incisions of various depths in stratified material 40. Furthermore, laser apparatus 50 may be utilized to form incisions with varying depths. For example, a first portion of incision 45a may only extend through first layer 41, and a second portion of incision 45a may extend through both of first layer 41 and second layer 42. In order to form incisions with variable depth, the power, focus, and/or velocity of laser beam 51 may be varied while forming incision 45a.

Factors that determine the depth of incision 45a include the power output of laser apparatus 50, the focus of laser beam 51, the velocity of laser beam 51 relative to stratified material 40, and the specific materials forming stratified material 40. For materials such as synthetic leather, leather, polymer sheets, and polymer textiles, which are often incorporated into footwear uppers, the power of laser beam 51 is generally in a range of 0.25 to 25 watts, for example. If laser beam 51 has a relatively narrow focus, the power of laser beam 51 may be decreased to account for the greater energy per unit area in laser beam 51. Similarly, if laser beam 51 has a relatively wide focus, the power of laser beam 51 may be increased to account for the lesser energy per unit area in laser beam 51. The velocity of laser beam 51 also affects the depth of incision 45a. If laser beam 51 is directed to a specific portion of stratified material 40 for a relatively short period of time, then the depth of incision 45a will be relatively shallow. If, however, laser beam 51 is directed to the specific portion of stratified material 40 for a relatively long period of time, then the depth of incision 45a will be greater. The velocity of laser beam 51 relative to stratified material 40 is generally determinative of the time period that laser beam 51 is directed toward a specific portion of stratified material 40. Finally, the composition of layers 41-43 affect the depth of incision 45a. Whereas materials such as leather, synthetic leather, and polymer textiles may require a relatively small power to form incision 45a, other materials such as high-density polymers and metals may require greater power to form incision 45a to the same depth. Accordingly, many factors are considered in determining the proper power, focus, and/or velocity of laser beam 51 for forming incision 45a to a prescribed depth.

Laser apparatus 50 may include an emitter for laser beam 51 that moves adjacent to stratified material 40 and forms the incisions in stratified material 40. That is, the shape of the various incisions may be controlled by movements of laser apparatus 50 relative to stratified material 40. Alternately, laser beam 51 may reflect off of one or more movable or pivotable mirrors, and the shape of the incisions in stratified material 40 may be controlled by movements of the mirrors.

Laser beam 51 heats selected areas of stratified material 40 and forms incisions 45a and 45b by burning or incinerating the selected areas of stratified material 40. In order to prevent other areas of stratified material 40 from unintentionally burning, incisions 45a and 45b may be formed in the presence of a non-combustible fluid, such as carbon dioxide or nitrogen. That is, laser apparatus 50 may be configured to emit a non-combustible fluid when laser beam 51 is forming incisions 45a and 45b.

The disclosure of footwear 10 above included a discussion of various incisions 44a-44g that were formed in upper 30. The general technique utilized to form incisions 45a and 45b may also be utilized to form incisions 44a-44g. Prior to incorporating stratified material 40 into footwear 10, stratified material 40 is arranged in a planar configuration, as in FIG. 8. Laser apparatus 50 is then utilized to form three parallel incisions that correspond with the positions of incisions 44a-44c, which were disclosed as having a depth that extended only through first layer 41. Accordingly, incisions 44a-44c may be formed by making three parallel incisions that are similar to incision 45a. Laser apparatus 50 is then utilized to form an incision that corresponds with the position of line 44d, which was disclosed as having a depth that extended through both first layer 41 and second layer 42. Accordingly, incision 44d may be formed by making an incision that is similar to incision 45b. Through a similar process, incisions may be formed that correspond with the positions of incisions 44e-44g.

Figure 12:
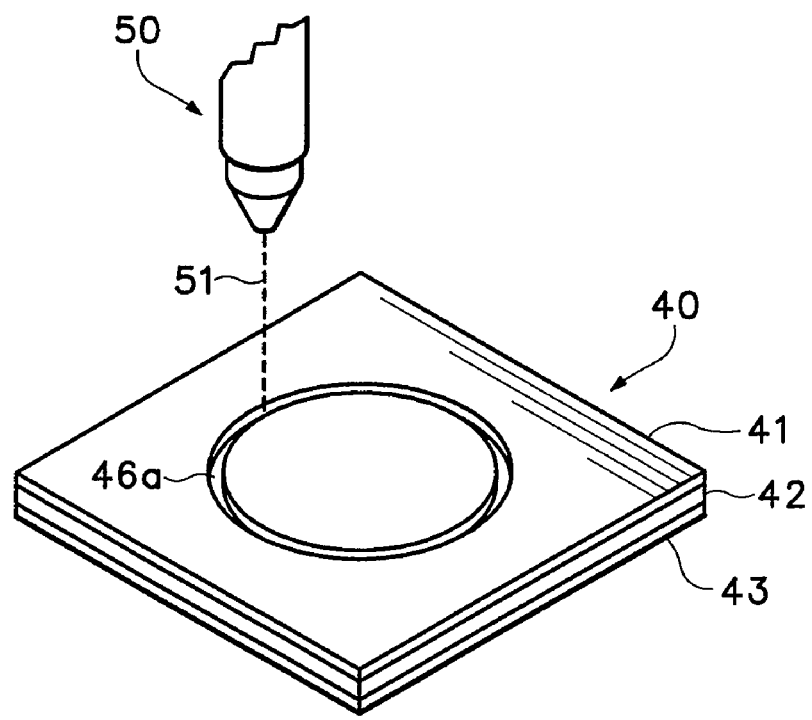
Figure 13:
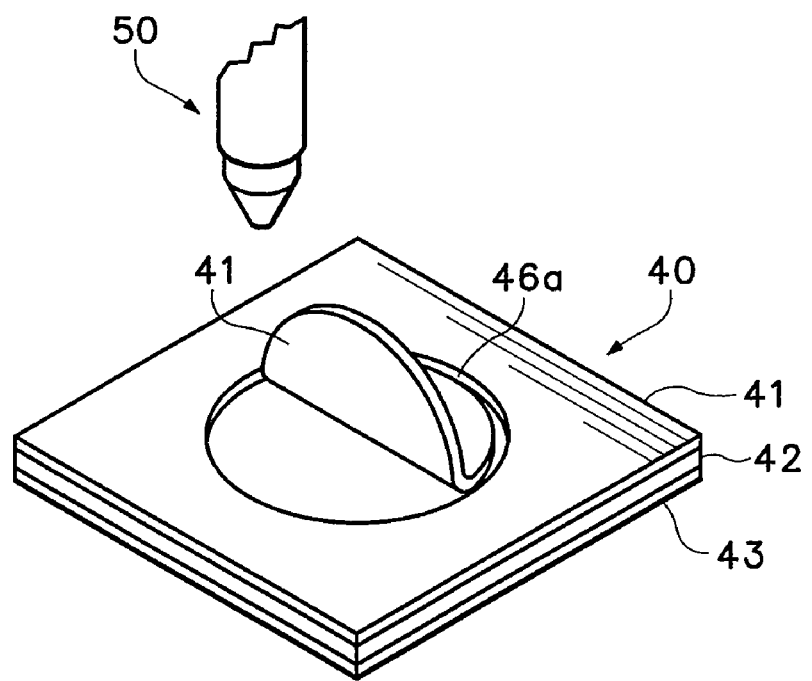

Laser apparatus 50 may also be utilized to remove areas of either first layer 41 or second layer 42. Referring to FIG. 12, laser beam 51 is depicted as inscribing a generally circular incision 46a that extends only through first layer 41 and segregates two portions of first layer 41. The material that bonds first layer 41 to second layer 42 may be an adhesive that is not fully cured at this stage in the process, or the material that bonds first layer 41 to second layer 42 may have limited strength, for example. Accordingly, layers 41-43 of stratified material 40 may be only lightly bonded (e.g., an adhesive between layers 41-43 may not be fully cured) so that the layers 41-43 may be peeled apart with little cosmetic impact. In any event, the portion of first layer 41 that is within the boundaries of incision 46a may be peeled away from second layer 42, as depicted in FIG. 13. Additional heat and pressure may then be applied to layers 41-43 to fully cure the adhesive or otherwise strengthen the bond between layers 41-43. This general procedure forms the removed area discussed relative to FIG. 4. By forming incision 46 at a depth that extends through both first layer 41 and second layer 42, the configuration discussed relative to FIG. 6 may be formed.

Figure 14:
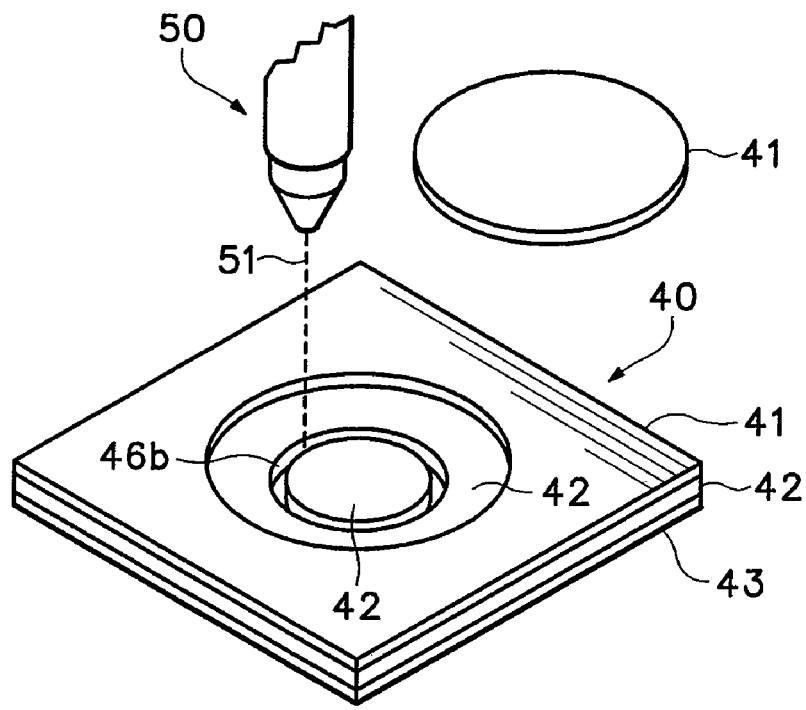
Figure 15:
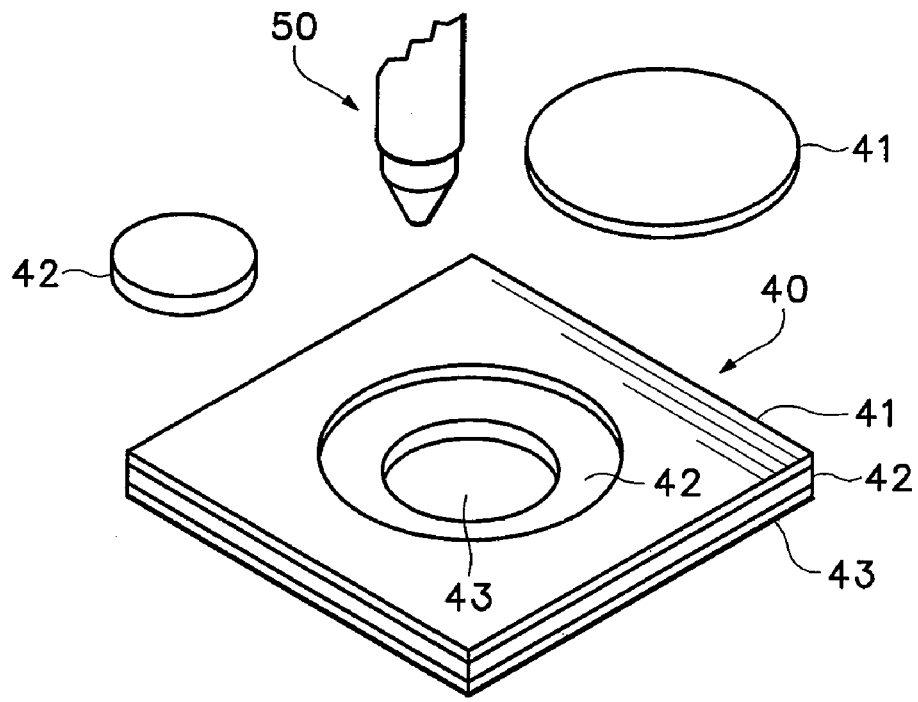

Laser apparatus 50 may then be utilized to form another generally circular incision 46b that extends through second layer 42, as depicted in FIG. 14. The portion of second layer 42 that is within the boundaries of incision 46b may be peeled away from third layer 43, as depicted in FIG. 15, to form another area of removed material. Accordingly, this general procedure may be utilized to form the removed areas discussed relative to FIG. 5.

Figure 16:
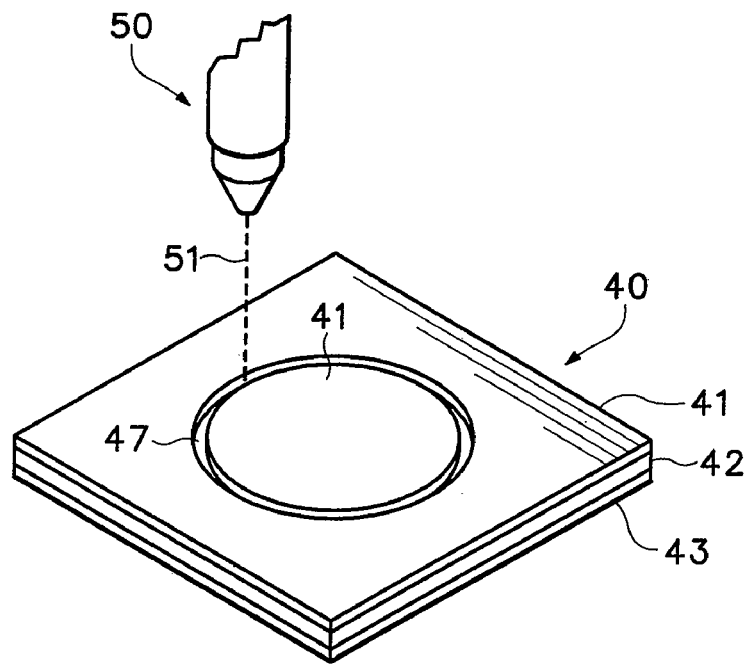
Figure 17:
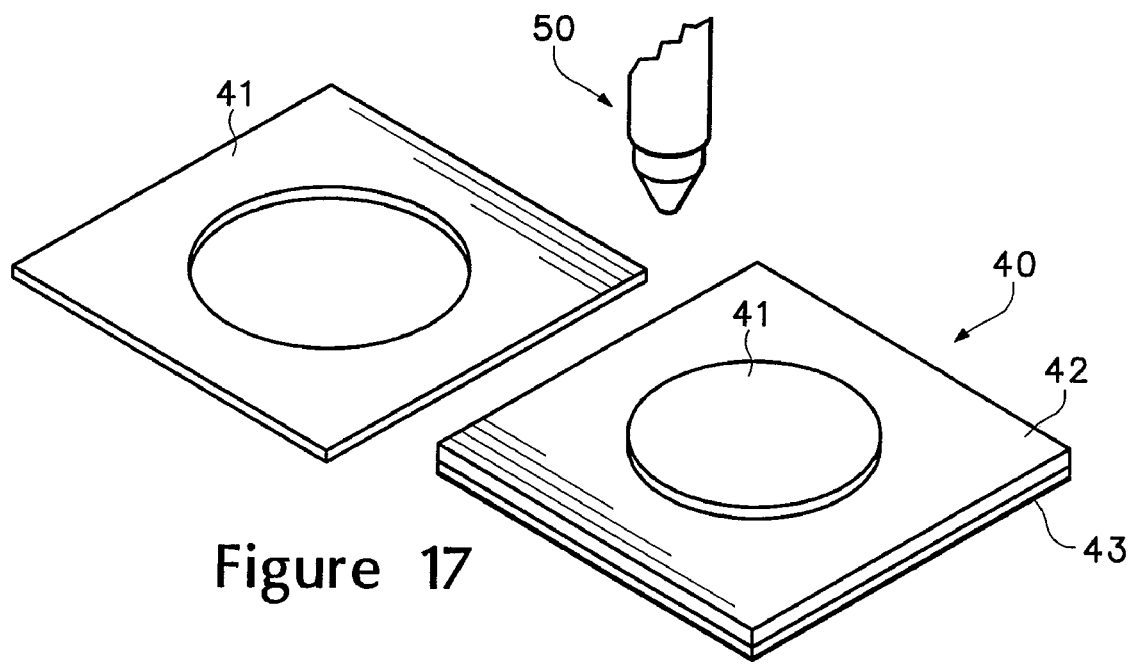

FIGS. 12-15 related to a method of removing portions of layers that are bounded by one or more incisions. The segregated portions of layers outside of the incisions may also be removed. Referring to FIG. 16, laser apparatus 50 has formed an incision 47 in first layer 41 that segregates two portions of first layer 41. The portion of first layer 41 that is outside of incision 47 may be peeled away, as depicted in FIG. 17, such that the portion of first layer 41 positioned within incision 47 remains secured to second layer 42. By utilizing this general procedure, the remaining portion of second layer 42 that is depicted in FIG. 7 may be formed.

The material that bonds first layer 41 to second layer 42 may be an adhesive that is not fully cured, as discussed above, and layers 41-43 of stratified material 40 may be only lightly bonded so that the layers 41-43 may be peeled apart following the formation of incisions. Once the final pattern is complete, stratified material 40 may be subjected to a combination of heat and pressure to completely fuse layers 41-43. Accordingly, heat and pressure may be applied to fully cure the material that bonds layers 41-43.

The general considerations discussed above with respect to FIGS. 8-11 are also applicable when removing areas of material. Accordingly, the factors that determine the depth of incisions 46a, 46b, and 47 include the power output of laser apparatus 50, the width of laser beam 51, the velocity of laser beam 51 relative to stratified material 40, and the specific materials forming stratified material 40. Furthermore, laser apparatus 50 may be configured to emit a non-combustible fluid when laser beam 51 is forming incisions 46a, 46b, and 47, thereby preventing excess burning of stratified material 40.

The above discussion discloses footwear 10 as having upper 30 formed of stratified material 40. Various portions of stratified material 40 are removed to expose underlying layers of stratified material 40. The removed portions may take the form of incisions or removed areas of material within stratified material 40. In general, the removed portions may be formed with laser apparatus 50 or any other cutting apparatus. Accordingly, laser apparatus 50 is utilized to direct laser beam 51 at stratified material 40 and form incisions in stratified material 40. The incisions may extend through one layer of stratified lateral 40, or through multiple layers of stratified material 40. As an alternative to forming the incisions in stratified material 40 as a whole, the incisions may be formed in the individual layers 41-43 separately, and the layers 41-43 may then be secured together.

Based upon the above discussion, portions of stratified material 40 may be removed to modify the stretch properties of upper 30 in specific areas. Stretch properties, however, are only one example of the many properties of upper 30 that may be modified by removing portions of first layer 41 and/or second layer 42. Further properties that may be modified include abrasion-resistance, durability, air-permeability, flexibility, and color, for example.

Figure 18:
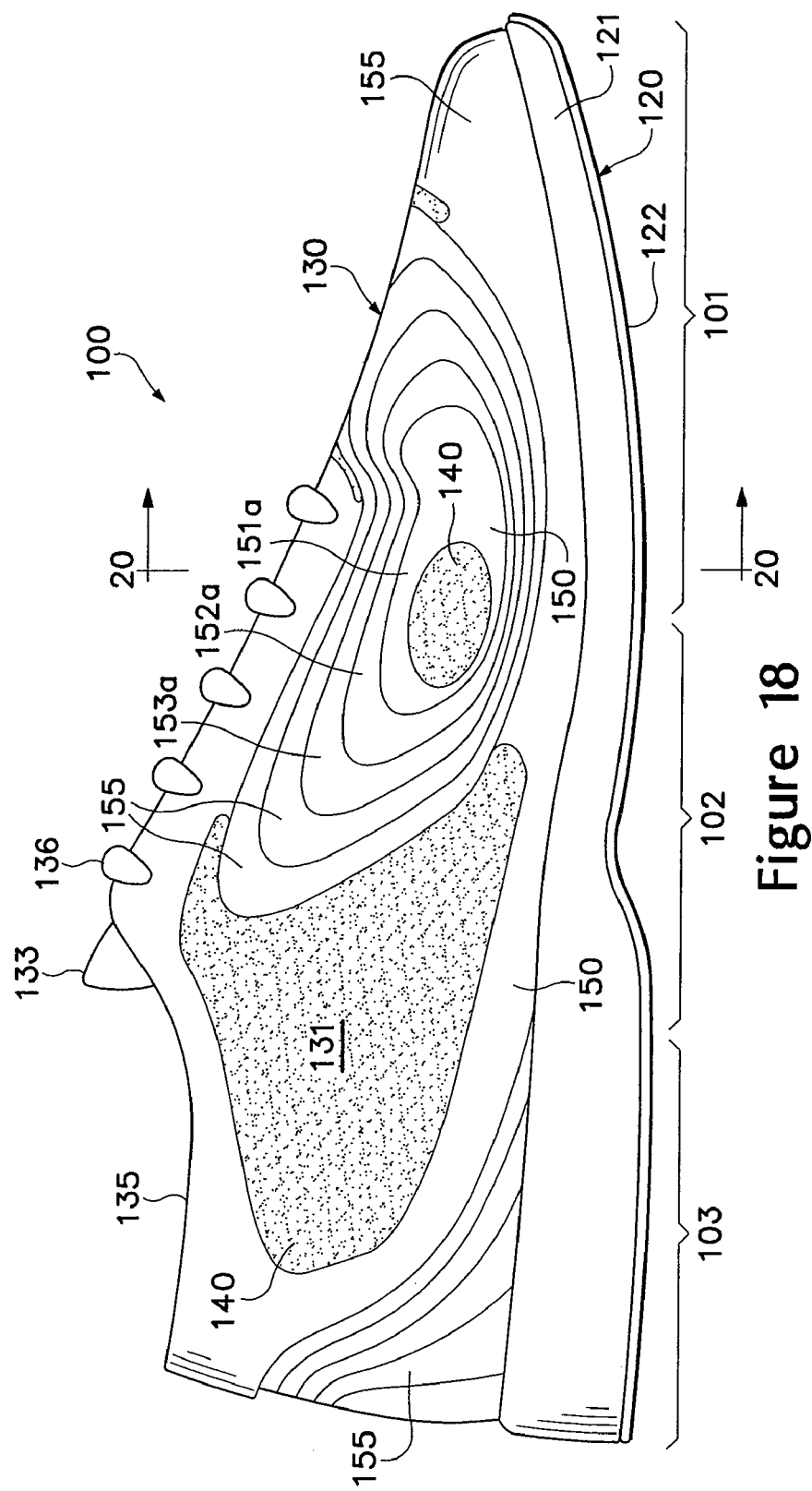
FIG. 18 is a lateral side elevational view of a second article of apparel having a configuration of footwear.
Figure 19:
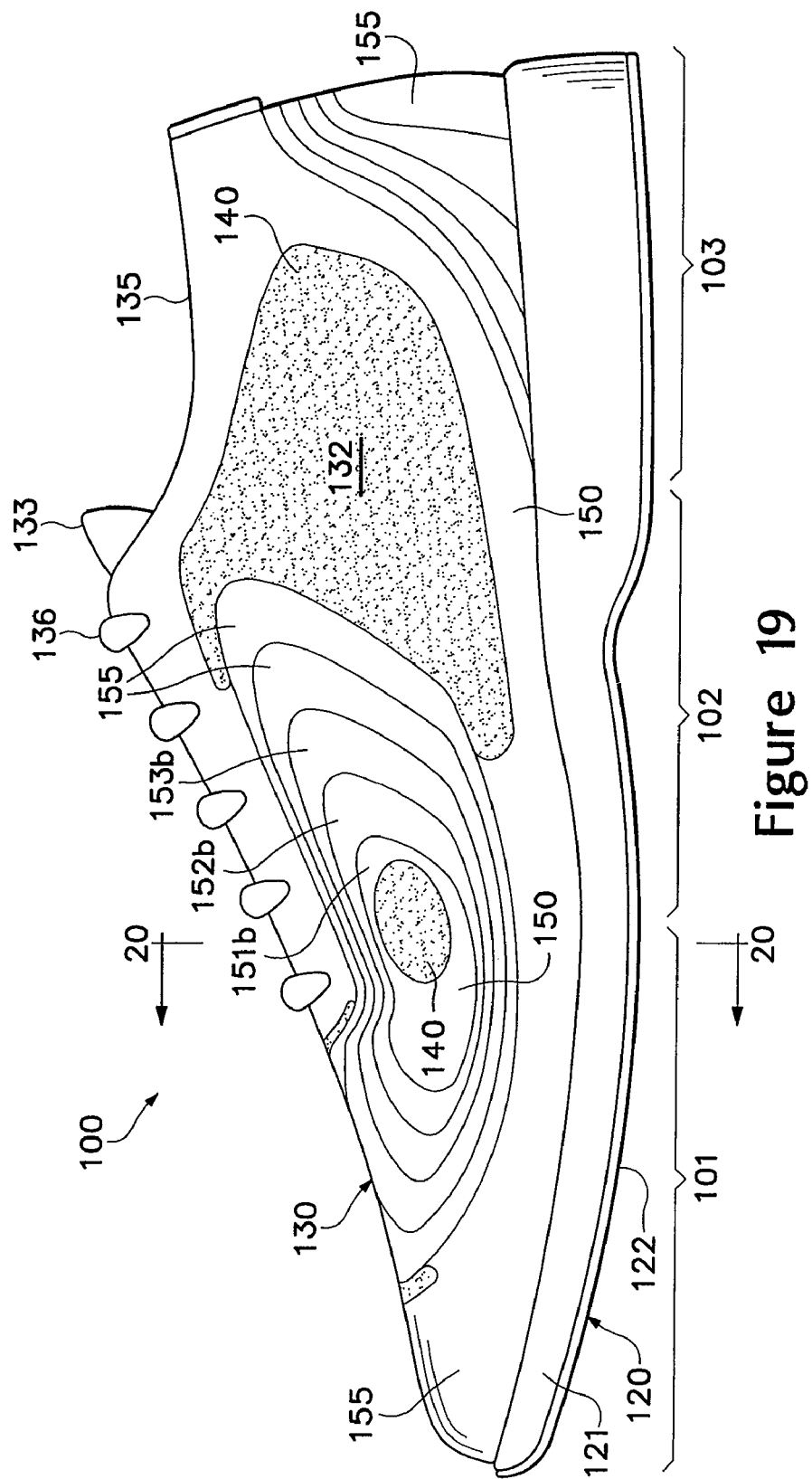
FIG. 19 is a medial side elevational view of the second article of apparel.
Figure 20:
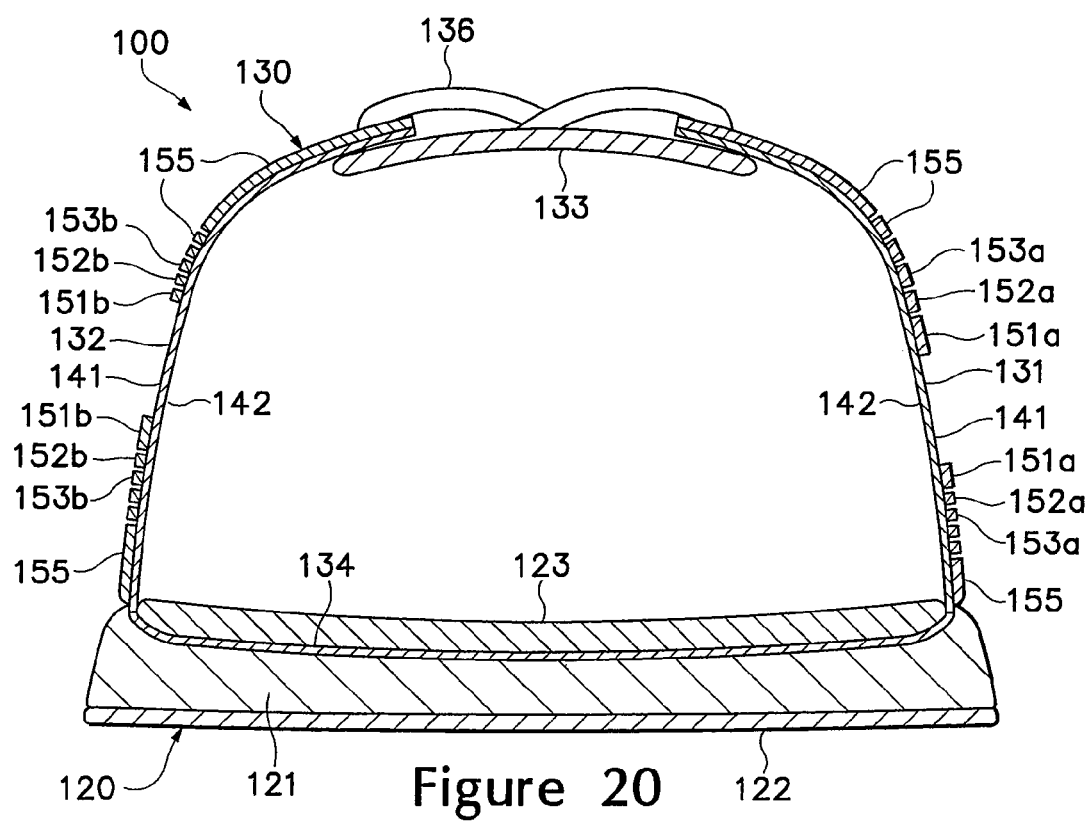
FIG. 20 is a cross-sectional view of the second article of apparel, as defined by section line 20 in FIGS. 18 and 19.

The general considerations discussed above relating to the formation of incisions and removed areas to selectively modify the stretch properties of an article of footwear may be applied to a wide range of footwear styles. Another article of apparel referred to as footwear 100 is depicted in FIGS. 18-20 and includes a sole structure 120 and an upper 130. Sole structure 120 is secured to a lower portion of upper 130 and provides a durable, wear-resistant component for attenuating ground reaction forces as footwear 100 impacts the ground during walking, running, or other ambulatory activities. The primary elements of sole structure 120 are a midsole 121, an outsole 122, and an insole 123 of generally conventional configuration. Upper 130 is formed from various material elements that are stitched or adhesively-bonded together to form an interior void that comfortably receives a foot and secures the position of the foot relative to sole structure 120.

Figure 21:
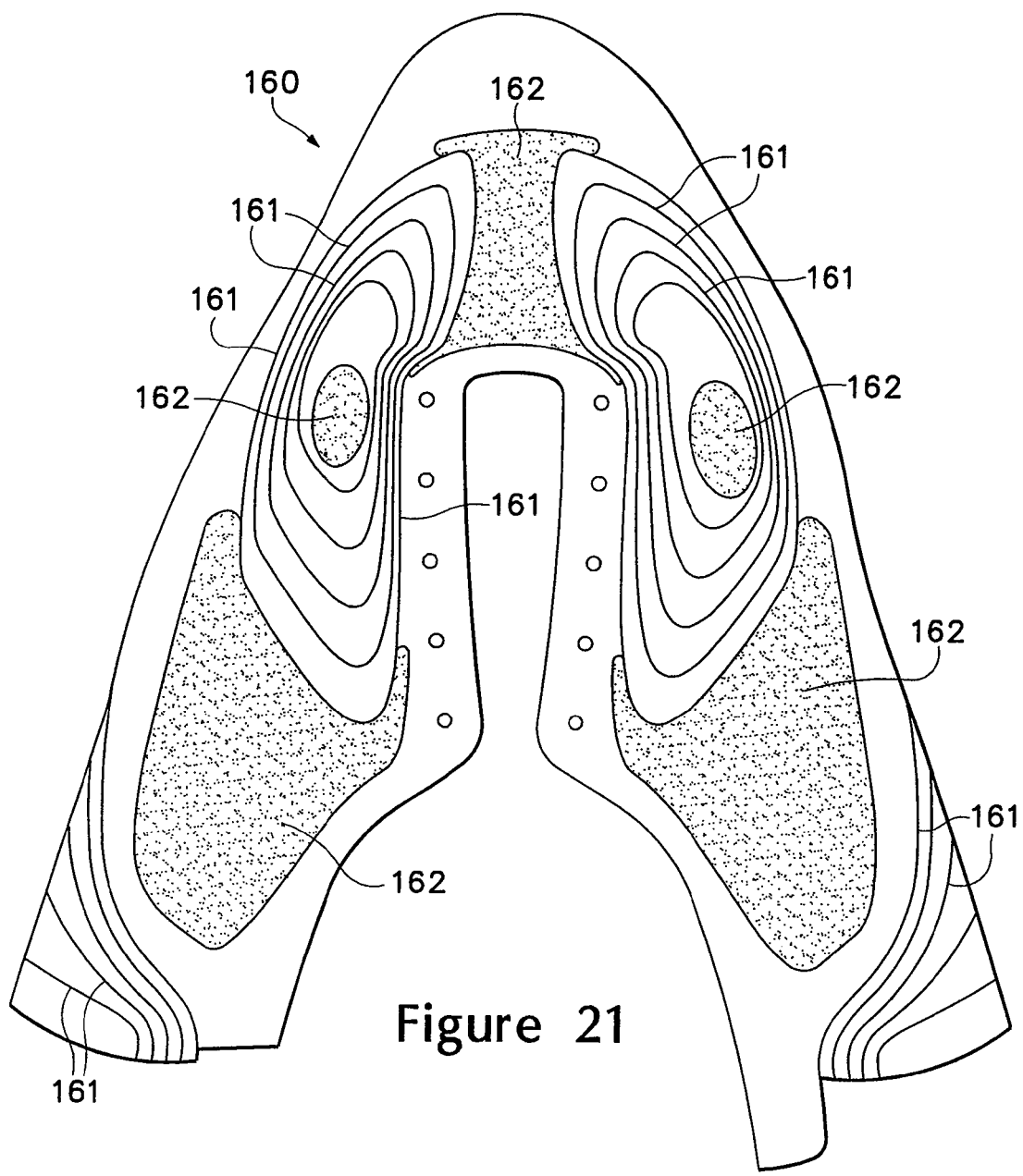
FIG. 21 is a plan view of an element of the second article of apparel.
Figure 22:
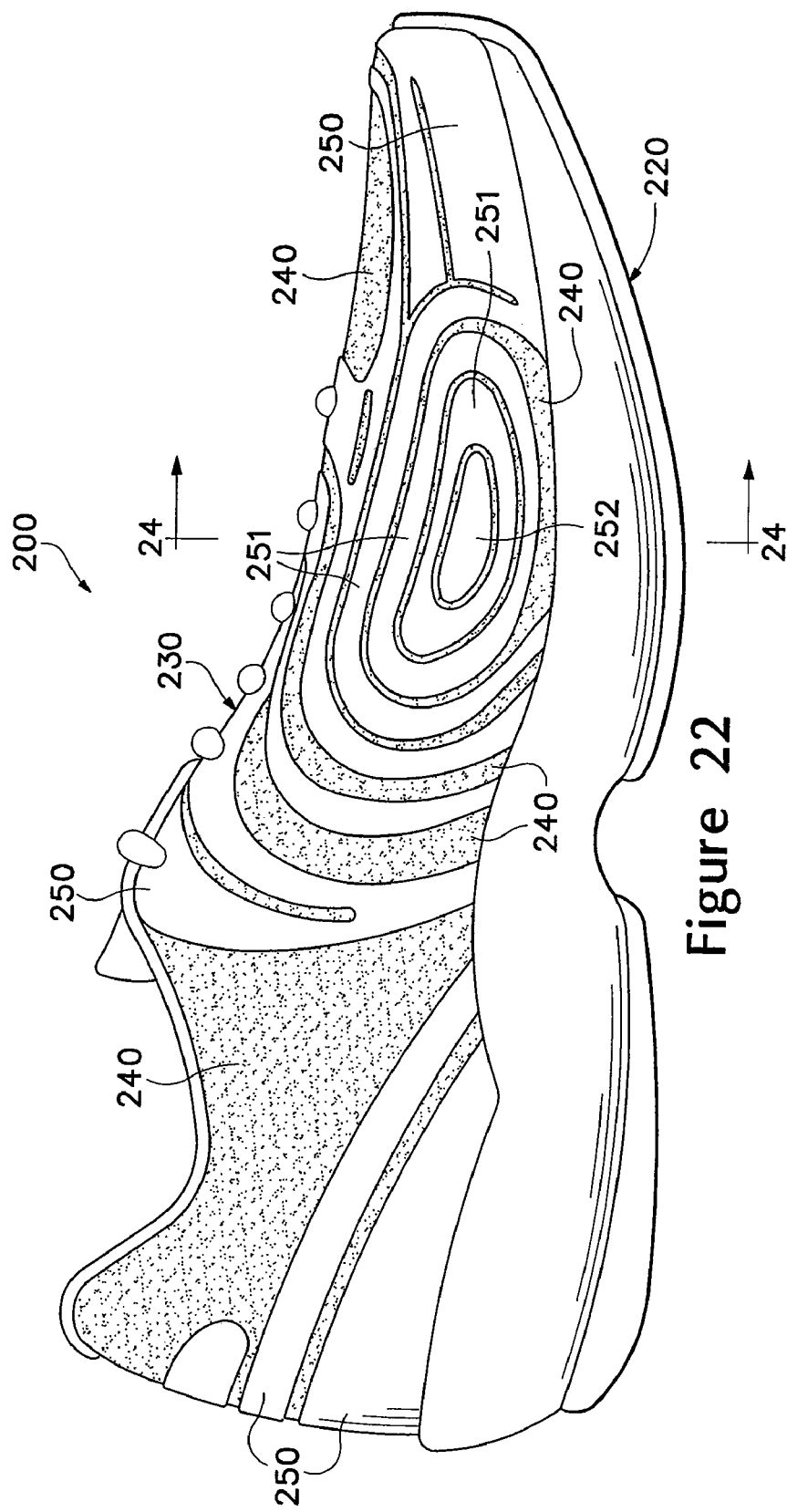
FIG. 22 is a lateral side elevational view of a third article of apparel having a configuration of footwear.

For purposes of reference, footwear 100 may be divided into three general regions: a forefoot region 101, a midfoot region 102, and a heel region 103, as defined in FIGS. 21 and 22. Regions 101-103 are not intended to demarcate precise areas of footwear 100. Rather, regions 101-103 are intended to represent general areas of footwear 100 that provide a frame of reference during the following discussion. Although regions 101-103 apply generally to footwear 100, references to regions 101-103 may also apply specifically to sole structure 120, upper 130, or an individual component or portion within either of sole structure 120 or upper 130.

The various material elements forming upper 130, which will be described in greater detail below, combine to provide a structure having a lateral side 131, an opposite medial side 132, a tongue 133, and a lasting sock 134 that form the void within upper 130. Lateral side 131 extends through each of regions 101-103 and is generally configured to contact and cover a lateral surface of the foot. A portion of lateral side 131 extends over an instep of the foot and overlaps a lateral side of tongue 133. Medial side 132 has a similar configuration that generally corresponds with a medial surface of the foot. A portion of medial side 132 also extends over the instep of the foot and overlaps an opposite medial side of tongue 133. In addition, lateral side 131, medial side 132, and tongue 133 cooperatively form an ankle opening 135 located primarily in heel region 103 to provide the foot with access to the void within upper 130.

Tongue 133 extends longitudinally along upper 130 and is positioned to contact the instep area of the foot. Side portions of tongue 133 may be secured to an interior surface of each of lateral side 131 and medial side 132. A lace 136 extends over tongue 133 and through apertures formed in lateral side 131 and medial side 132. Tongue 133 extends under lace 136 to separate lace 136 from the instep area of the foot. By increasing the tension in lace 136, the tension in lateral side 131 and medial side 132 may be increased so as to draw lateral side 131 and medial side 132 into contact with the foot. Similarly, by decreasing the tension in lace 136, the tension in lateral side 131 and medial side 132 may be decreased so as to provide additional volume for the foot within upper 130. This general configuration provides, therefore, a mechanism for at least partially adjusting the fit of upper 130 and accommodating various foot dimensions. The tension in lace 136 may also be decreased in order to increase a size of ankle opening 135, thereby permitting the foot to enter and be removed from footwear 100.

A variety of materials are suitable for upper 130, including the materials that are conventionally utilized in footwear uppers. Accordingly, upper 130 may be formed from combinations of leather, synthetic leather, natural or synthetic textiles, polymer sheets, polymer foams, mesh textiles, felts, non-woven polymers, or rubber materials, for example. As depicted in FIGS. 18-20, however, portions of lateral side 131 and medial side 132 may exhibit a configuration that includes a stratified material formed from at least two layers: a substrate layer 140 and a ring layer 150.

Substrate layer 140 and ring layer 150 impart a structure that selectively stretches or otherwise accommodates movement of the foot. In general, substrate layer 140 is formed from a material that stretches in at least one direction, but may also be formed from a material with multi-directional stretch. Although any of the materials discussed above for upper 130 are suitable for substrate layer 140, one example of a suitable material is a textile that incorporates elastane fibers, which are available from E.I. duPont de Nemours Company under the LYCRA trademark. Ring layer 150 is secured to substrate layer 140 through any conventional or nonconventional process that includes stitching or adhesive bonding, for example. In general, ring layer 150 is formed from a material that stretches to a lesser degree than substrate layer 140, thereby selectively inhibiting stretch in substrate layer 140. Any of the materials discussed above for upper 130 are also suitable for ring layer 150, including relatively non-extensible materials such as leather and synthetic leather.

Substrate layer 140 is depicted as a generally planar and continuous element that includes an outward-facing surface 141 and an inward-facing surface 142. In some embodiments, however, substrate layer 140 may be formed from multiple joined elements, or substrate layer 140 may have a perforated or otherwise non-continuous structure. In comparison, ring layer 150 is formed from various separate elements that include a first ring 151a, a second ring 152a, and a third ring 153a that are located on lateral side 131. In addition, ring layer 150 includes a first ring 151b, a second ring 152b, and a third ring 153b that are located on medial side 132. Ring layer 150 may also include various additional elements 155 that may be further rings or other shapes.

First ring 151a, second ring 152a, and third ring 153a form a concentric configuration. A region that is central to each of rings 151a, 152a, and 153a is positioned at the interface of forefoot region 101 and midfoot region 102. The central region is approximately positioned, therefore, at an area generally corresponding with locations of the metacarpo-phalangeal joints (i.e., joints between the metacarpals and phalanges) of the foot received by upper 130. First ring 151a is positioned adjacent to the central region, which is an area of upper 130 where substrate layer 140 is exposed. Second ring 152a is positioned adjacent to first ring 151a and encircles first ring 151a. Similarly, third ring 153a is positioned adjacent to second ring 152a and encircles second ring 152a. Accordingly, rings 151a, 152a, and 153a form a concentric configuration in upper 130.

Rings 151a, 152a, and 153a exhibit an elongate and non-regular configuration. In further embodiments of the invention, rings 151a, 152a, and 153a may exhibit a variety of regular and non-regular shapes, including ellipses, circles, triangles, squares, rectangles, pentagons, and hexagons, for example. Similarly, rings 151a, 152a, and 153a may each exhibit different shapes such that first ring 151a is circular and second ring 152a is hexagonal, for example. The number of rings in ring layer 150 may also vary. In some embodiments, portions of ring layer 150 may only include first ring 151a and second ring 152a, or portions of ring layer 150 may include greater than three rings, as depicted in FIG. 18. In general, therefore, ring layer 150 forms a concentric configuration with the number and shapes of the rings being variable. Although rings 151a, 152a, and 153a are shown as being on the exterior of footwear 100, rings 151a, 152a, and 153a may also be located in the interior of footwear 100. That is, rings 151a, 152a, and 153a may be located between various material layers so as to be, at most, minimally visible from the exterior of footwear 100.

The positions of rings 151a, 152a, and 153a may also vary within the scope of the present invention. As discussed above, rings 151a, 152a, and 153a are positioned at the interface of forefoot region 101 and midfoot region 102, or at an area generally corresponding with locations of the metacarpo-phalangeal joints of the foot received by upper 130. In further embodiments, rings similar to rings 151a, 152a, and 153a may be located on tongue 133 or in heel region 103, for example.

The considerations discussed above for rings 151a, 152a, and 153a also apply to first ring 151b, second ring 152b, and third ring 153b. Whereas rings 151a, 152a, and 153a are located on lateral side 131, rings 151a, 152a, and 153a are located on medial side 132. First ring 151b, second ring 152b, and third ring 153b form a concentric configuration, and a central region of rings 151b, 152b, and 153b is approximately positioned at an area generally corresponding with locations of the metacarpo-phalangeal joints (i.e., joints between the metacarpals and phalanges) of the foot received by upper 130. First ring 151b is positioned adjacent the central region, where substrate layer 140 is exposed. Second ring 152b is positioned adjacent to first ring 151b and encircles first ring 151b. Similarly, third ring 153b is positioned adjacent to second ring 152b and encircles second ring 152b. Accordingly, rings 151b, 152b, and 153b form a concentric configuration in upper 130.

As discussed above, ring layer 150 is structured such that rings 151a, 152a, and 153a are located on lateral side 131 and positioned at an area generally corresponding with locations of the metacarpo-phalangeal joints of the foot received by upper 130. Similarly, ring layer 150 is structured such that rings 151b, 152b, and 153b are located on medial side 132 and positioned at an area generally corresponding with locations of the metacarpo-phalangeal joints of the foot received by upper 130. More simply, the two portions of ring layer 150 are located on opposite sides of upper 130 and at positions that extend between forefoot region 101 and midfoot region 102.

FIGS. 18-20 depict upper 130 in a generally unstretched or otherwise unexpanded configuration that occurs when the foot is not located within the void in upper 130. When the foot is located within the void in upper 130 or the foot flexes during walking, running, or other ambulatory activities, upper 130 stretches. In effect, therefore, upper 20 expands to accommodate the contours of the foot and flexing of the foot during walking, running, or other ambulatory activities.

As discussed above, ring layer 150 is formed from a material that stretches to a lesser degree than substrate layer 140, thereby selectively inhibiting stretch in substrate layer 140. This structure provides a configuration wherein a greater degree of expansion occurs in areas of upper 130 where substrate layer 140 is exposed than in areas where ring layer 150 is present. Outward forces upon upper 130 (i.e., forces directed outward from the void within upper 130) tend to place upper 130 in tension and may stretch portions of upper 130. The degree of stretch at a particular location depends upon the degree of force and the materials forming upper 130 at that location. In order to permit greater stretch in selected locations, ring layer 150 is absent. For example, various incisions are formed between adjacent rings 151a, 152a, 153a, 151b, 152b, 153b, and additional elements 155 to expose portions of substrate layer 140. Various areas are also present in upper 130 that correspond with regions where ring layer 150 is absent and substrate layer 140 is present. Exposing portions of substrate layer 140 effectively permits greater stretch, therefore, in those portions of upper 130 where ring layer 150 is absent. That is, the selective formation of incisions and removed areas may be utilized to control the stretch properties of upper 130.

A planar element 160 that forms portions of ring layer 150 is depicted in FIG. 21. A plurality of incisions 161 are defined in ring layer 150 to define rings 151a, 152a, 153a, 151b, 152b, 153b, and additional elements 155. Incisions 161 may be formed through any of the methods discussed above for footwear 10. That is, a die may be utilized to form incisions 161 in ring layer 150, and ring layer 150 may then be secured to substrate layer 140 and incorporated into footwear 100. In some embodiments, a die may be utilized to form incisions 161 when ring layer 150 is secured to substrate layer 140. A laser apparatus may also be utilized to form incisions 161, whether or not ring layer 150 is secured to substrate layer 140. Following the formation of incisions 161, various areas 162 may be removed from ring layer 150 to form the regions in upper 130 where substrate layer 140 is exposed. Accordingly, the formation of incisions 161 and the removal of areas 162 may be utilized to selectively expose portions of substrate layer 140 and control the stretch in upper 130.

As discussed in the Background of the Invention section above, articles of apparel are designed from planar elements of material to accommodate a shape that is non-planar. More particularly, footwear is formed from planar elements to accommodate the complex shape of a foot. The locations of incisions 161 in element 160 may be selected to correspond with the topography of a portion of the foot. As noted above, rings 151a, 152a, 153a, 151b, 152b, 153b are positioned at an area generally corresponding with locations of the metacarpo-phalangeal joints of the foot received by upper 130. Incisions 161 may, therefore, correspond with the topography of the foot at the metacarpo-phalangeal joints. In areas where incisions 161 are spaced away from each other, the topography of the foot may be relatively flat. Accordingly, less stretch is necessary in these areas to accommodate the shape of the foot. In areas where incisions 161 are close together, however, the topography of the foot may generally change more rapidly. Accordingly, greater stretch is necessary to accommodate the shape of the foot, and the greater stretch is effectively produced by the greater amount of substrate layer 140 that is exposed by incisions 161 and areas 162.

In designing footwear 100, the topography of at least a portion of the foot is determined. The topography may be of a specific individual (i.e., the individual wearing footwear 100), or the topography may be of a shape that approximates a common shape of a foot. A plurality of concentric incisions 161 are then formed in ring layer 150, and incisions 161 are shaped as topographical lines corresponding to the topography of the foot. If not already secured to substrate layer 140, ring layer 150 is located in a coextensive relationship with substrate layer 140. The combination of ring layer 150 and substrate layer 140 is then incorporated into footwear 100. Incisions 161 effectively mimic, therefore, the topographical contours of the foot and form stretch in upper 130 that corresponds with the contours of the foot. A similar procedure may be utilized to form other types of apparel.

Figure 23:
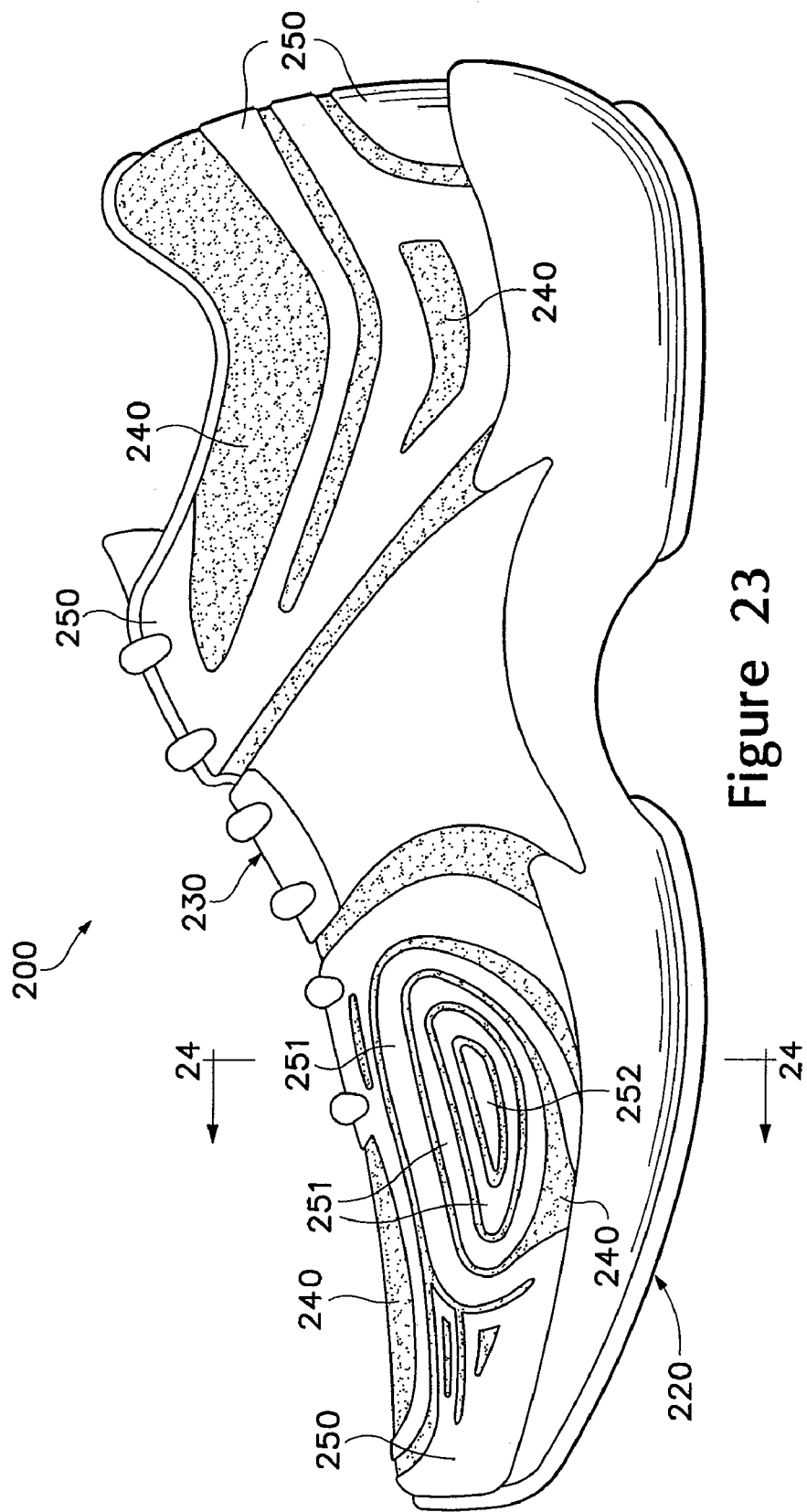
FIG. 23 is a medial side elevational view of the third article of apparel.
Figure 24:
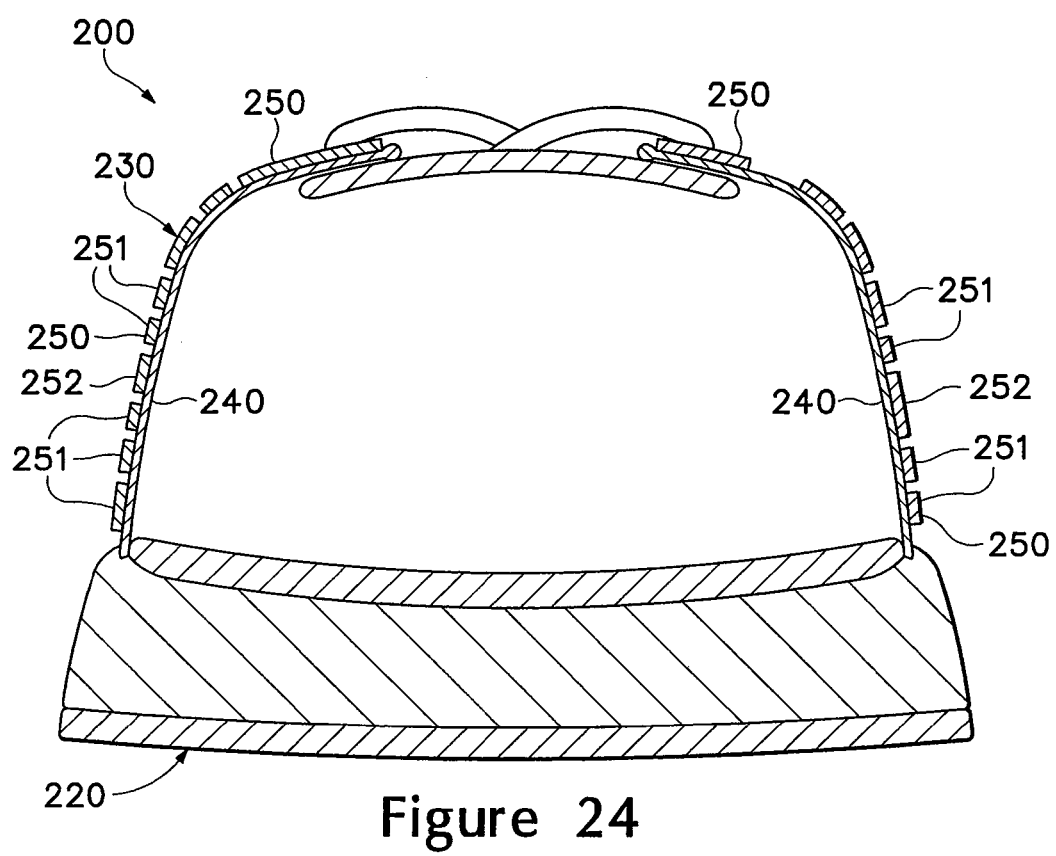
FIG. 24 is a cross-sectional view of the third article of apparel, as defined by section line 24 in FIGS. 22 and 23.

Another article of apparel referred to as footwear 200 is depicted in FIGS. 22-24 and includes a sole structure 220 and an upper 230. Sole structure 220 is secured to a lower portion of upper 230 and provides a durable, wear-resistant component for attenuating ground reaction forces as footwear 200 impacts the ground during walking, running, or other ambulatory activities. Upper 230 is formed from various material elements that are stitched or adhesively-bonded together to form an interior void that comfortably receives a foot and secures the position of the foot relative to sole structure 220.

A variety of materials are suitable for upper 230, including the materials that are conventionally utilized in footwear uppers. Accordingly, upper 230 may be formed from combinations of leather, synthetic leather, natural or synthetic textiles, polymer sheets, polymer foams, mesh textiles, felts, non-woven polymers, or rubber materials, for example. As depicted in FIGS. 22-24, however, portions of upper 230 may exhibit a configuration that includes a stratified material with a substrate layer 240 and a ring layer 250.

Substrate layer 240 and ring layer 250 impart a structure that selectively stretches or otherwise accommodates movement of the foot. In general, substrate layer 240 is formed from a material that stretches in at least one direction, but may also be formed from a material with multi-directional stretch. Although any of the materials discussed above for upper 230 are suitable for substrate layer 240. Ring layer 250 is secured to substrate layer 240 through any conventional or nonconventional process that includes stitching or adhesive bonding, for example. In general, ring layer 250 is formed from a material that stretches to a lesser degree than substrate layer 240, thereby selectively inhibiting stretch in substrate layer 240. Any of the materials discussed above for upper 230 are also suitable for ring layer 250.

Substrate layer 240 is depicted as a generally planar and continuous element, but may be formed from multiple joined elements, or substrate layer 240 may have a perforated or otherwise non-continuous structure. In comparison, ring layer 250 is formed from various separate elements that define various rings 251 on the medial and lateral sides of footwear 200. The rings form a concentric configuration, and a pair of central elements 252 are located at the center of the various rings. Each of central elements 252 are positioned at the interface of a forefoot region and a midfoot region of footwear 200. Central elements are approximately positioned, therefore, at an area generally corresponding to the locations of the metacarpo-phalangeal joints (i.e., joints between the metacarpals and phalanges) of the foot received by upper 230. The shapes and positions of rings 251 may vary within the scope of the present invention. Although rings 251 are shown as being on the exterior of footwear 200, rings 251 may also be located in the interior of footwear 200.

FIGS. 22-24 depict upper 230 in a generally unstretched or otherwise unexpanded configuration that occurs when the foot is not located within the void in upper 230. When the foot is located within the void in upper 230 or the foot flexes during walking, running, or other ambulatory activities, upper 130 stretches. In effect, therefore, upper 230 expands to accommodate the contours of the foot and flexing of the foot during walking, running, or other ambulatory activities.

As discussed above, ring layer 250 is formed from a material that stretches to a lesser degree than substrate layer 240, thereby selectively inhibiting stretch in substrate layer 240. This structure provides a configuration wherein a greater degree of expansion occurs in areas of upper 230 where substrate layer 240 is exposed than in areas where ring layer 250 is present. Outward forces upon upper 230 (i.e., forces directed outward from the void within upper 230) tend to place upper 230 in tension and may stretch portions of upper 230. The degree of stretch at a particular location depends upon the degree of force and the materials forming upper 230 at that location. In order to permit greater stretch in selected locations, ring layer 250 is absent. For example, various incisions are formed between adjacent rings 251 and central elements 252 to expose portions of substrate layer 240. Various areas are also present in upper 230 that correspond with regions where ring layer 250 is absent and substrate layer 240 is exposed. Exposing portions of substrate layer 240 effectively permits greater stretch, therefore, in those portions of upper 230 where ring layer 250 is absent.

As with footwear 100, the spaces between rings 251 and the other places where ring layer 250 is absent may be selected to correspond with the topography of a portion of the foot. In designing footwear 200, therefore, the topography of at least a portion of the foot is determined and a plurality of concentric rings 251 separated by incisions are then formed in ring layer 250 to correspond with the topography of the foot.

Figure 25:
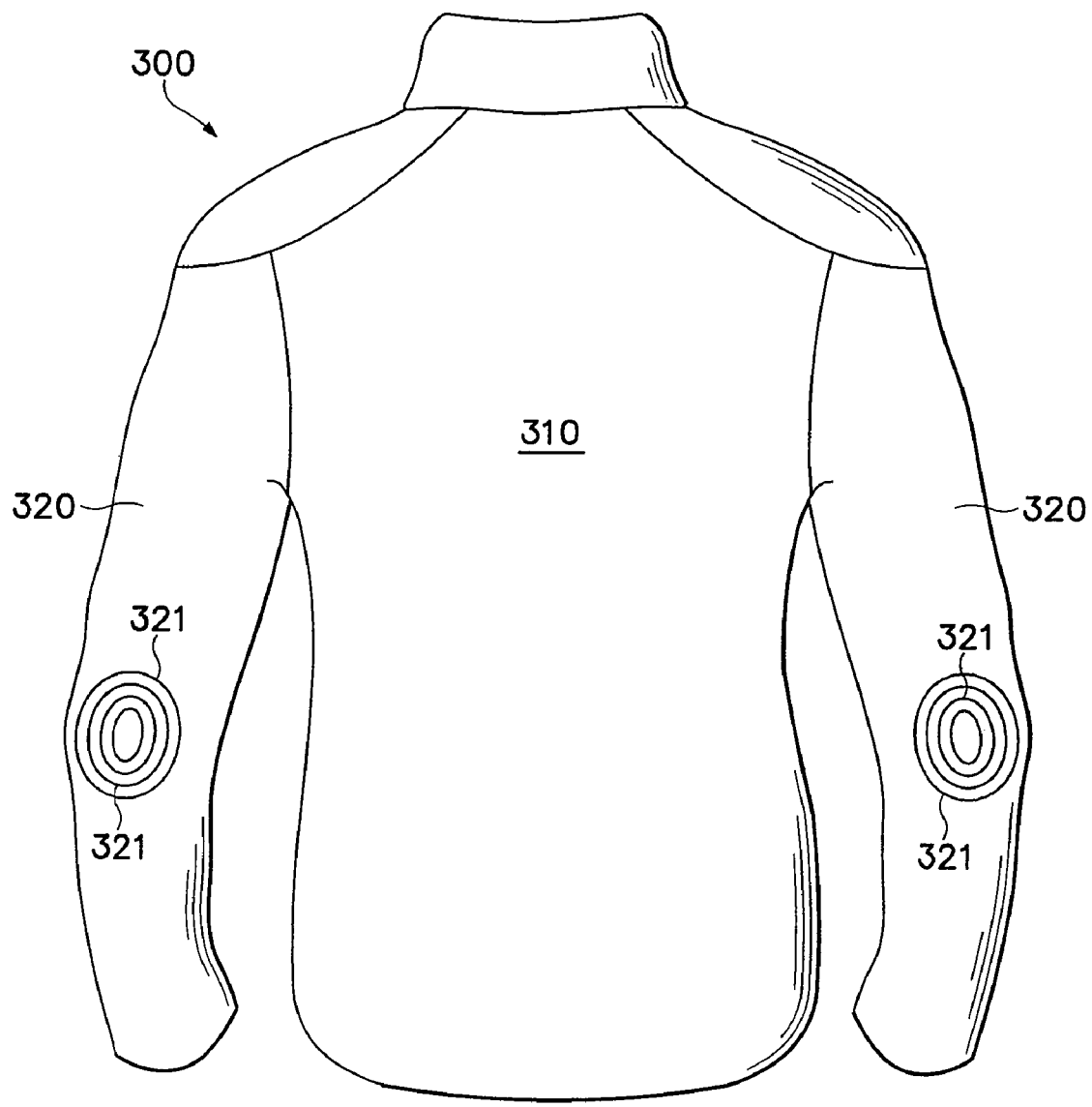
FIG. 25 is an elevational view of a fourth article of apparel having a configuration of a jacket.
Figure 26:
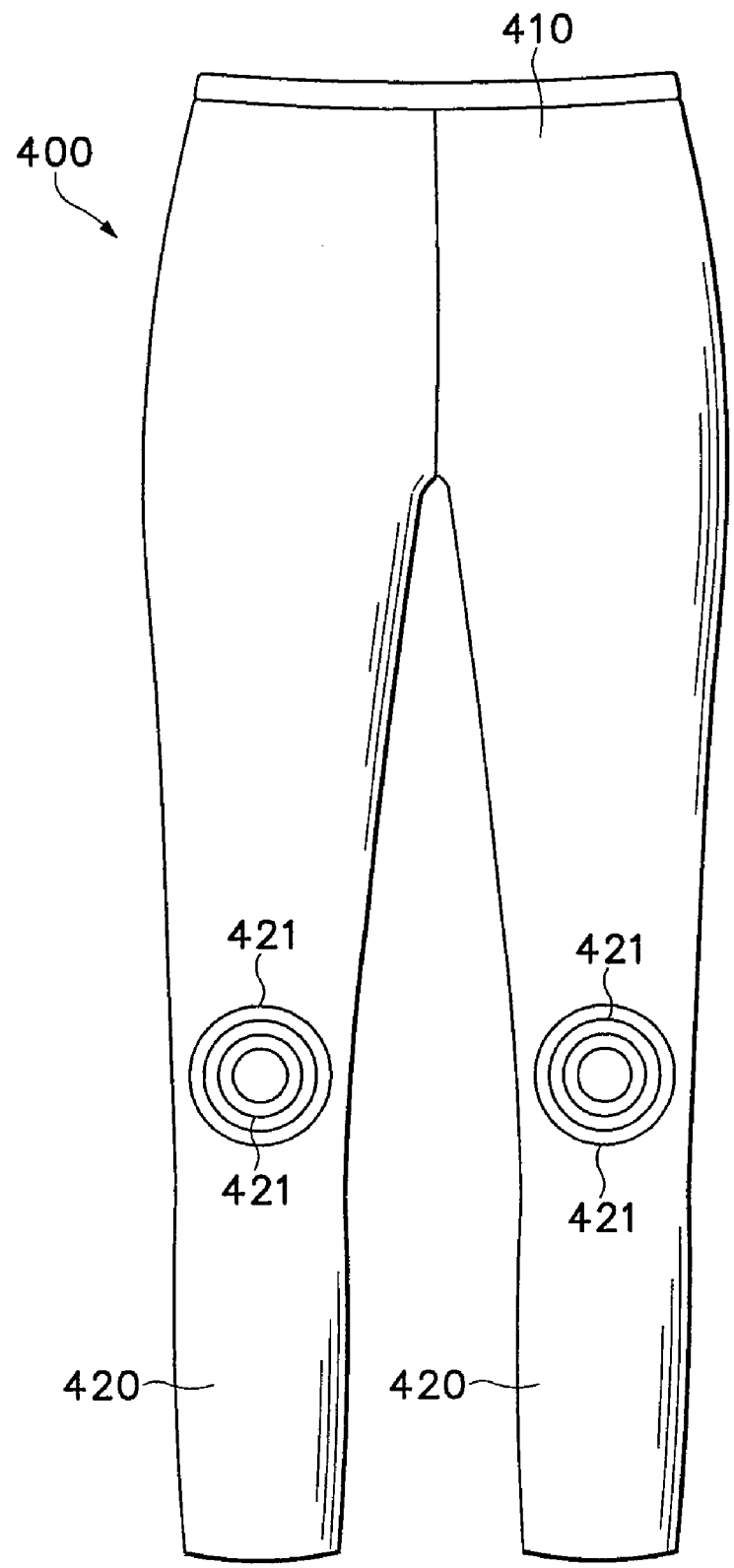
FIG. 26 is an elevational view of a fifth article of apparel having a configuration of pants.

Although the concepts related to the present invention are applicable to footwear, the concepts may also be incorporated into other types of apparel, including shirts, headwear, coats, underwear, gloves, and socks, for example. With reference to FIG. 25 a jacket 300 is depicted as including a torso region 310 and a pair of arm regions 320. In at least the elbow portions of arm regions 320, jacket 300 incorporates a stratified material that defines a plurality of incisions 321. The stratified material includes at least two layers with different stretch properties, and incisions 321 effectively exposes the greater stretch of the underlying layer. With reference to FIG. 26, a pair of pants 400 is depicted as including a waist region 410 and a pair of leg regions 420. In at least the knee portions of leg regions 420, pants 400 incorporates a stratified material that defines a plurality of incisions 421. The stratified material includes at least two layers with different stretch properties, and incisions 421 effectively expose the greater stretch of the underlying layer. Accordingly, the concepts related to the present invention are applicable to a variety of apparel types.

The various configurations discussed above involve at least two layers of material that each have different stretch properties. In some aspects of the invention, however, various stretch properties may be incorporated into a single layer of material. For example, an upper may be formed to have a textile structure formed through knitting or other methods of mechanically-manipulating yarns. The yarns forming the textile structure may each have different stretch properties. Accordingly, concentric rings with less stretchability than other portions of the textile structure may be formed, thereby providing a structure that is similar to the structure disclosed with respect to footwear 100 and 200. As a further alternative, the upper may be formed of a polymer material, and rings with a more stretchable material may be embedded with in the polymer material. In general, the rings with form relatively thin areas of upper and the more stretchable material of the rings will increase the stretchability of these areas. Alternately, the rings may exhibit less stretchability. Accordingly, some aspects of the invention may be incorporated into a single layer of material.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. A method of manufacturing an article of apparel, the method comprising the steps of:
    determining a topography of at least a portion of an individual covered by the article of apparel;
    forming a substrate layer extending around at least a portion of the individual and having a first degree of stretchability;
    forming a ring layer secured to the substrate layer and formed of a material having a second degree of stretchability different from the first degree of stretchability, forming the ring layer including:
        forming a first ring, the first ring being a topographical line corresponding to the topography;
        forming a second ring, the second ring being a topographical line corresponding to the topography; and
        positioning the first ring adjacent to and within the second ring to define an aperture exposing at least a portion of the substrate layer.

2. The method of claim 1, wherein forming the first ring and the second ring includes forming an incision in the ring layer between the first and second rings.

3. The method of claim 2, wherein the step of forming the first ring and the second ring includes utilizing a laser apparatus to etch portions of the ring layer.

4. The method of claim 1, further including forming a third ring being a topographical line corresponding to the topography.

5. The method of claim 4, wherein the first and second rings are positioned within the third ring.

6. The method of claim 5, wherein forming the third ring includes forming an incision in the ring layer between the second and third rings.

7. The method of claim 6, wherein the step of forming the third ring includes utilizing a laser apparatus to etch portions of the ring layer.

8. The method of claim 1, further including forming a central element within the first ring.

9. The method of claim 1, wherein forming the substrate layer includes forming the substrate layer of a textile.

10. A method of manufacturing an article of apparel, the method comprising steps of:
   determining a topography of at least a portion of an individual covered by the article of apparel;
   providing a substrate layer at least partially formed from a material having a first degree of stretchability;
   forming a plurality of concentric incisions in an incised layer, the incisions being shaped as topographical lines corresponding to the topography, the incised layer being formed from a material having a second degree of stretchability, the first degree of stretchability being greater than the second degree of stretchability; and
   locating the incised layer coextensive with the substrate layer.

11. The method recited in claim 10, further including a step of incorporating the substrate layer and the incised layer into an article of footwear.

12. The method recited in claim 11, further including a step of positioning a center of the incisions to correspond with joints between metacarpals and phalanges of a foot received by the footwear.

13. The method recited in claim 10, further including a step of incorporating the substrate layer and the incised layer into one of apparel for covering a torso and apparel for covering legs of an individual.

14. The method recited in claim 10, wherein the step of locating is performed prior to the step of forming.

15. The method recited in claim 10, wherein the step of forming includes utilizing a laser apparatus to etch portions of the incised layer.

16. A method of forming an article of apparel having a configuration of footwear including an upper defining a void for receiving a foot and a sole structure secured to the upper, comprising:
   forming a substrate layer forming at least a portion of an exterior surface of the upper and extending from at least a lateral side of the upper to a medial side of the upper, the substrate layer being formed of a stretchable material;
   forming a first ring layer secured to the substrate layer and forming at least a second portion of the exterior surface of the upper, wherein forming the first ring layer including:
      positioning the first ring layer on the medial side of the upper;
      locating the first ring layer to correspond to joints between metacarpals and phalanges of the foot; and
      forming the first ring layer including at least a first pair of concentric rings defining an aperture exposing the substrate layer;
   forming a second ring layer secured to the substrate layer and forming at least a third portion of the exterior surface of the upper, forming the second ring layer including:
      positioning the second ring layer on the lateral side of the upper;
      locating the second ring layer to correspond to joints between metacarpals and phalanges of the foot; and
      forming the second ring layer to include at least a second pair of concentric rings defining an aperture exposing the substrate layer.

17. The method of claim 16, wherein forming the substrate layer includes forming the substrate layer of a textile.

18. The method of claim 16, wherein the first pair of concentric rings abut each other and the second pair of concentric rings abut each other.

19. The method of claim 16, wherein the first pair of rings are spaced from each other and the second pair of rings are spaced from each other.

20. The method of claim 16, wherein the first ring layer includes a central element located within the first pair of rings.

* * * * *